United States Patent [19]

Suzuki et al.

[11] Patent Number: 4,709,934
[45] Date of Patent: Dec. 1, 1987

[54] VEHICLE LEVELING SYSTEM

[75] Inventors: Hideo Suzuki; Kunihide Okamoto; Yasuyuki Hayashi; Mitsuru Aiba, all of Shizuoka, Japan

[73] Assignee: Kabushiki Kaisha Showa Seisakusho, Tokyo, Japan

[21] Appl. No.: 811,943

[22] Filed: Dec. 18, 1985

[51] Int. Cl.$^4$ ............................................. B60G 17/00
[52] U.S. Cl. ..................................... 280/6 R; 280/114
[58] Field of Search ......... 280/6 R, 707, 714, DIG. 1; 267/64.16; 73/40, 46, 11, 118; 188/299; 364/131, 558, 559

[56] References Cited

U.S. PATENT DOCUMENTS

| | | | |
|---|---|---|---|
| 2,936,611 | 5/1960 | Le Mat et al. | 73/40 |
| 3,510,143 | 5/1970 | Carpenter | 280/6 R |
| 3,747,949 | 7/1973 | Engfer | 280/707 |
| 4,015,859 | 4/1977 | Hegel et al. | 280/707 |
| 4,396,202 | 8/1983 | Kami et al. | 280/6 R |
| 4,422,661 | 12/1983 | Kawamura | 280/707 |

FOREIGN PATENT DOCUMENTS 84611  5/1984  Japan .................................. 280/707

Primary Examiner—John J. Love
Assistant Examiner—Karin L. Ferriter
Attorney, Agent, or Firm—Bogucki, Scherlacher, Mok & Roth

[57] ABSTRACT

A vehicle leveling system employing pneumatic leveling units has a valve unit and a control device therefor for supplying a gas pressure from a gas pressure generator unit to and discharging it from the pneumatic leveling units. The control device comprises switches and a pressure sensor for detecting the gas pressure in the pneumatic leveling units and issuing a signal indicating the detected gas pressure, the control device including a central processing unit. The control device is operable in response to commands applied by the switches and the output signal from the pressure sensor, and has various control modes.

10 Claims, 17 Drawing Figures

VEHICLE LEVELING SYSTEM

BACKGROUND OF THE INVENTION

The present invention relates to a vehicle leveling system.

There have been proposed various road vehicle leveling systems for adjusting the height of the body or sprung mass of a road vehicle with respect to the ground. One type of such leveling system employs a pressurized gas as a leveling medium. The pressurized gas is supplied from a gas pressure generator unit such as a compressor to a pneumatic leveling unit through a valve mechanism which controls the pressurized gas as it is fed into or discharged from the pneumatic leveling unit. The leveling system of this design is disclosed in U.S. Pat. Nos. 3,881,743 and 4,396,202.

As described in the above U.S. Patents, the pneumatic leveling unit is normally constructed wholly or partly as a vehicle suspension spring since the pneumatic leveling unit is essentially analogous in structure to an air spring. The leveling system also has a valve device and its control device for delivering the pressurized gas into and discharging it from the pneumatic leveling unit. The better the functions of the valve device and the control device, the more easily and conveniently the leveling system can be operated. The conventional leveling systems remain to be improved for easier and more convenient operation.

SUMMARY OF THE INVENTION

The present invention provides a vehicle leveling system having control means for adjusting the height of a vehicle body more easily and conveniently with respect to the ground.

According to the present invention, a vehicle leveling system comprises a pneumatic leveling unit for adjusting the height of a vehicle body in response to supply and discharge of a pressurized gas into and from the pneumatic leveling unit, gas pressure generator means for generating the pressurized gas to be supplied to the pneumatic leveling unit, valve means pneumatically connected to the leveling unit and the gas pressure generator means, and control means for controlling the gas pressure generator means and the valve means to supply the pressurized gas to and discharge it from the pneumatic leveling unit. The control means includes switch means and a pressure sensor for detecting the gas pressure in the pneumatic leveling unit and issuing an output signal representing the detected gas pressure. The control means is operable in response to commands applied by the switch means and the output signal from the pressure sensor.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
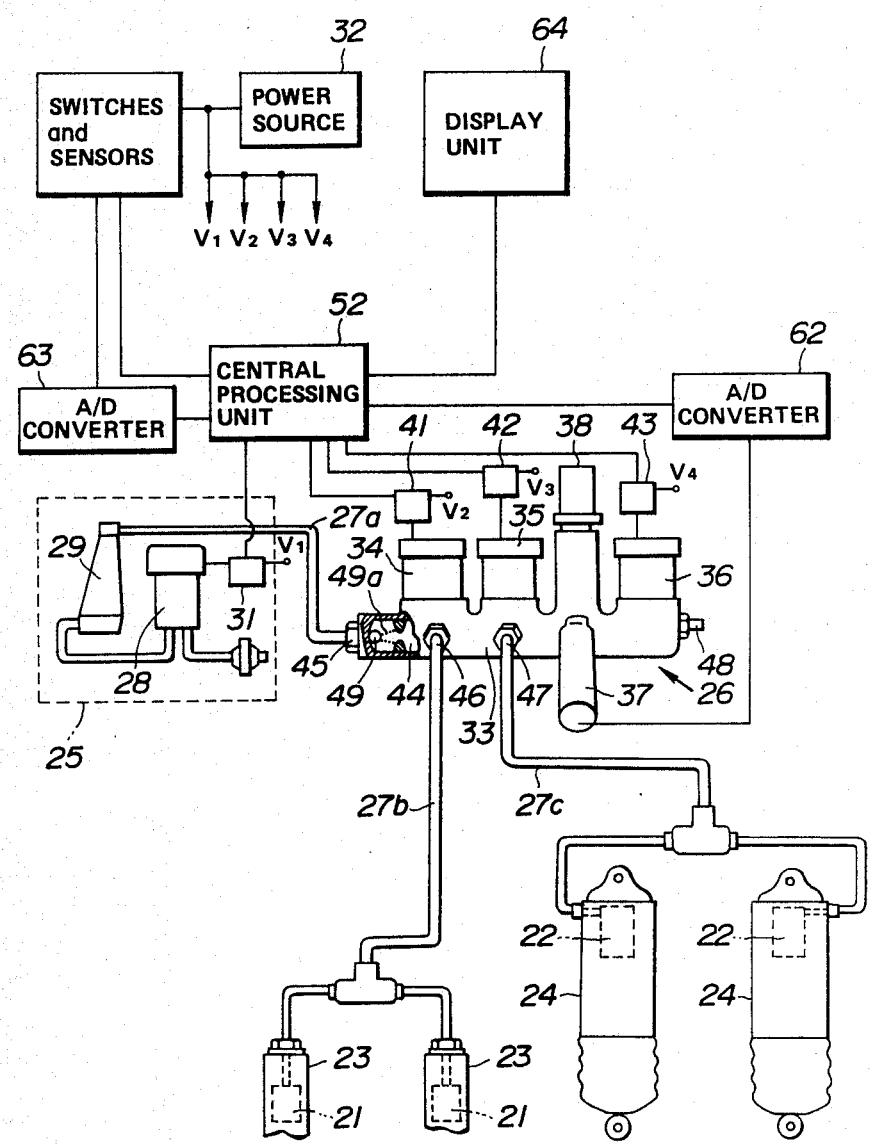
FIG. 1 is a schematic diagram of a vehicle leveling system according to the present invention.

As shown in FIG. 1, a vehicle leveling system according to the present invention comprises a pneumatic mechanism and a control device. The vehicle leveling system illustrated in FIG. 1 is constructed for use on a motorcycle having a pair of front forks supporting a front wheel and a pair of rear cushions supporting a rear wheel. However, the principles of the present invention are not limited to motorcycles, but are also applicable to other vehicles.

The pneumatic mechanism comprises pneumatic leveling units 21, 22 incorporated in the front forks 23 and the rear cushions 24, an air pressure generator unit 25 for generating air pressure to be supplied to the pneumatic leveling units 21, 22, and a valve unit 26 pneumatically connected to the pneumatic leveling units 21, 22 and the air pressure generator unit 25 through air pipes 27a, 27b, 27c. These pneumatic mechanism elements are schematically shown in FIG. 1. Each of the pneumatic leveling units 21, 22 may comprise the leveling unit disclosed in the U.S. Patents referred to above or any other known leveling unit. The air pressure generator unit 25 comprises an air compressor 28 and an air drier 29 for drying pressurized the air discharged from the air compressor 28. To the air compressor 28, there is connected an actuator 31 for actuating the air compressor 28, the actuator 31 being connected to a power source 32. The air drier 29 has an outlet port coupled via the air pipe 27a to the valve unit 26.

The valve unit 26 includes a body or housing 33, a first control valve 34 mounted on the body 33, a second control valve 35 mounted on the body 33, a release valve 36 mounted on the body 33, a pressure sensor 37 mounted on the body 33, and a relief valve 38 mounted on the body 33. Each of the first control valve 34, the second control valve 35, and the release valve 36 is a solenoid-controlled valve. The solenoids of these valves can be energized by respective actuators 41, 42, 43 connected to the power supply 32. The body 33 has a central passage or chamber 44 defined therein, and also has a first port 45 connected to the air pressure generator unit 25 through the air pipe 27a, a second port 46 connected to the pneumatic leveling units 21 in the front forks 23 through the air pipe 27b, a third port 47 connected to the pneumatic leveling units 22 in the rear cushions 24 through the air pipe 27c, and a fourth port 48 vented to the atmosphere. The central passage 44 is connected to the first port 45 through a check valve 49 which allows pressurized air to flow from the air pressure generator unit 25 into the valve unit 26, but prevents pressurized air from flowing in the opposite direction. The second and third ports 46, 47 are connected through the respective first and second control valves 34, 35 to the central passage 44, and can be brought into and out of fluid communication with the central passage 44 by the associated control valves 34, 35. The fourth port 48 is connected through the release valve 36 to the central passage 44, and can be brought into and out of fluid communication with the central passage 44 by the release valve 36. When the release valve 36 is open, therefore, the central passage 44 is vented to the atmosphere. The pressure sensor 37 serves to detect the air pressure in the central passage 44 and generate an output electric signal indicating the detected air pressure. The relief valve 38 prevents the air pressure in the central passage 44 from increasing excessively.

The front pneumatic leveling units 21 are effective in adjusting the height of the front body portion of the motorcycle, and the rear pneumatic leveling units 22 are effective in adjusting the height of the rear body portion of the motorcycle. Pressurized air is supplied to and discharged from the front and rear pneumatic leveling units 21, 22 at different times. For adjusting the height of the front motorcycle body portion, the first control valve 34 is opened and the second control valve 35 is closed. For adjusting the height of the rear motorcycle body portion, the second control valve 35 is opened and the first control valve 34 is closed. When the body height is to be increased, the air compressor 28 is operated to generate air pressure which is fed into the pneumatic leveling units. When the body height is to be reduced, the release valve 36 is operated to discharge pressurized air from the leveling units into the atmosphere.

Figure 2:
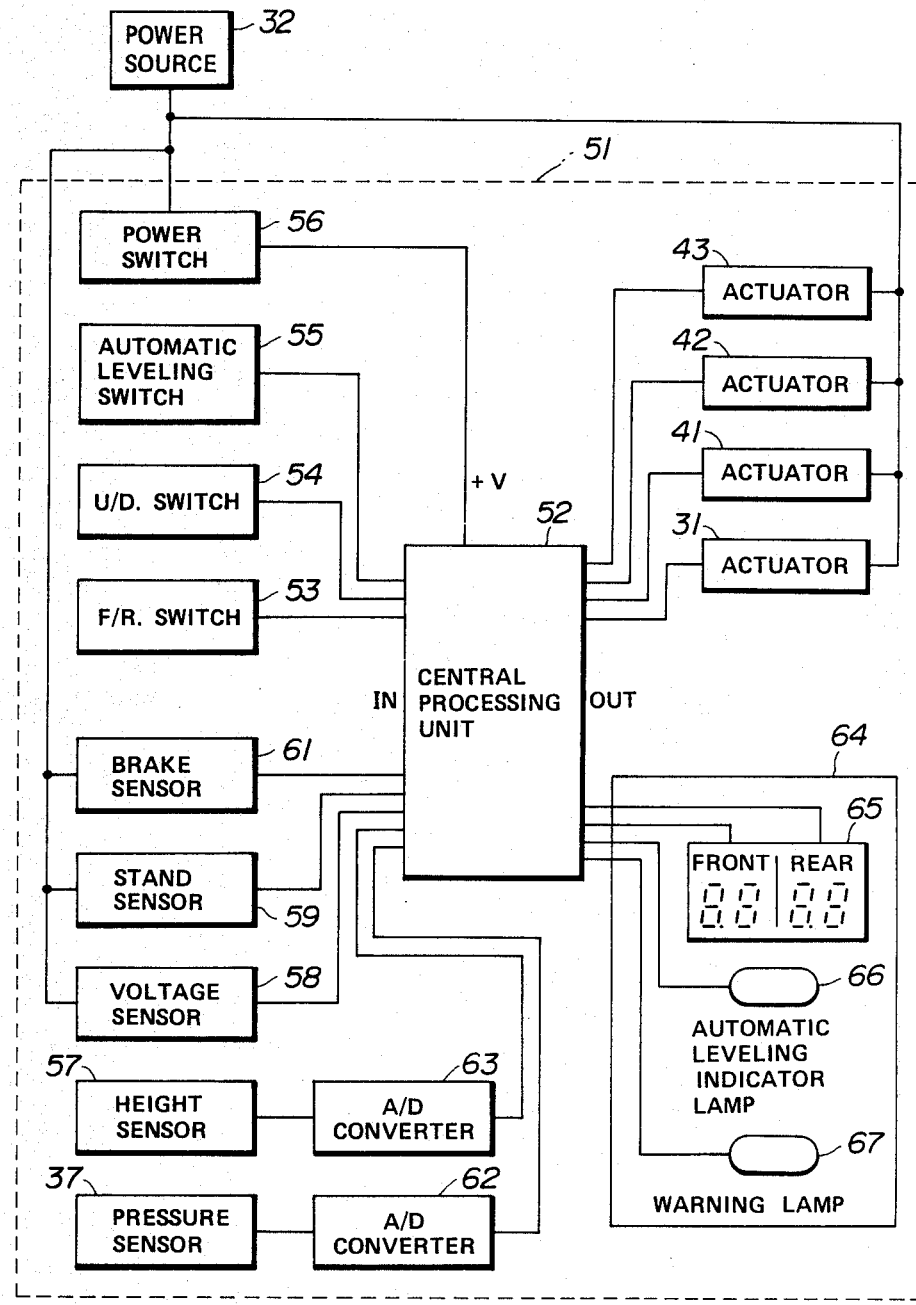
FIG. 2 is a block diagram of a control device of the vehicle leveling system shown in FIG. 1.

The control device of the vehicle leveling system will be described below. As illustrated in FIG. 2, the control device, generally denoted at 51, includes a CPU (Central Processing Unit) 52, and various switches, sensors, and actuators connected to the CPU 52. The CPU 52 comprises a processor for performing mathematical computations and various functions, a ROM (Read-Only Memory) for storing a resident program, a RAM (Random-Access Memory) for storing data, and an interface through which signals can be delivered to and from the processor. The CPU 52 may be of a known hardware design incorporating such components which is available in the market. Alternatively, the CPU 52 can be constructed by a person of ordinary skill in the art, using commercially avaiable parts.

The switches connected to the CPU 52 include a pair of manual leveling switches 53, 54 for manually adjusting the motorcycle height, an automatic leveling switch 55 for enabling the control device 51 to automatically adjust the motorcycle height, and a power switch 56 for energizing the control device 51. The power switch 56 doubles as a reset switch for resetting the CPU 52. One of the manual leveling switches 53 is a switch for indicating whether the front or rear motorcycle body portion is to be manually leveled. This switch comprises a two-position selector switch (hereinafter referred to as a "F/R switch") having two positions for instructing the CPU 52 to effect manual leveling operation of the front and rear pneumatic leveling units 21, 22, respectively. The other manual leveling switch 54 is used to indicate whether the motorcycle body is to be raised or lowered, and comprises a three-position selector switch (hereinafter referred to as a "U/D switch") having three positions for instructing the CPU 52 to effect manual body raising operation, disable manual leveling operation, and also effect manual body lowering operation, respectively. The U/D switch 54 is also capable of applying manual leveling operation starting and ending commands to the CPU 52. The automatic leveling switch 55 comprises a self-return or unlocking pushbutton switch.

The sensors coupled to the CPU 52 include the pressure sensor 37 mounted on the valve unit 26, a height sensor 57 for detecting the height of the rear body portion of the motorcycle and issuing an output electric signal dependent on the detected height, a voltage sensor 58 for detecting abnormal power supply voltages by checking the power source 32 for its voltage and issuing an output signal only when the power source voltage remains in a proper range, a stand sensor 59 for issuing an output signal when the motorcycle rests on its stand, and a brake sensor 61 for issuing an output signal when the motorcycle is braked. The stand and brake sensors 59, 61 are limit switches connected to the power source 32. The height sensor 57 may be of a conventional structure. Most conventional height sensors are arranged to detect the relative position of the sprung mass and the unsprung mass of vehicles. In the vehicle leveling system disclosed herein, the output signal from the height sensor is referred to by the CPU only when automatic leveling is performed. Since only the height of the rear body portion is controlled in the automatic leveling mode, no height sensor is employed for detecting the height of the front body portion. However, it is possible to make a modification including a height sensor for detecting the height of the front body portion, based on this disclosure.

The control device 51 also includes A/D converters 62, 63 for converting the analog output signals from the pressure sensor 37 and the height sensor 57 into respective digital signals, and a display unit 64 energizable under the control of the CPU 52. The display unit 64 has a pressure display panel 65 for displaying the air pressure in the front penumatic leveling units 21 and the air pressure in the rear pneumatic leveling units 22, an indicator lamp 66 for indicating that the vehicle leveling system is in the automatic leveling mode, and a warning lamp 67 for indicating a failure (described later) of the control device 64. The display panel 65 and the lamps 66, 67 are of a known structure.

Different CPU operating programs are employed for different CPU designs. Therefore, a flowchart which is specific enough for those skilled in the art to write such various programs will be described below, so that the present invention can be achieved using various CPUs.

FIGS. 3 through 11 show flowchart pieces which are combined to provide the overall flowchart indicating operation of the CPU 52. It should be noted that the illustrated flowchart uses certain special symbols and rules which are different from the ordinary flowcharting conventions as follows:

(a) In some stages or steps, two or more statements or instructions are divided by a colon or colons. Plural statements in one stage may be carried out in any order.

(b) A flag is normally indicative of two statuses ("0" and "1") of one bit. According to the invention, a flag (U/D flag) for indicating the condition of the U/D switch 54 represents three different statuses of the switch by using three out of four statuses of two bits. One flag condition therefore corresponds to a two-figure binary representation. However, the flag is expressed by "U", "D", and "N" instead of binary expressions in the flowchart for an easier understanding.

(c) A flag (F/R flag) for indicating the statuses of the F/R switch 53 is an ordinary flag representing two statuses. This flag is expressed by "F" and "R" instead of "0" and "1" in the flowchart for a better understanding.

(d) Several counters are described in the flowchart, and these counters are software-implemented and function as timers. This is because the control device requires a plurality of timer means, but many commercially available CPUs contain only one hardware timer means. The statement "COUNTER+1" in the flowchart means that the count held by the counter is incremented by "1".

(e) For operating the air compressor 28, the first and second control valves 34, 35, and the release valve 36, the CPU 52 applies required signals to the interface connected to the actuators 31, 41, 42, and 43. Inasmuch as it is known in the art how to control external devices with a CPU, the flowchart merely states that these external devices are controlled by the CPU without referring to the intervening components. This holds true for the display of the air pressures.

Now, the operation specified by the flowchart will be described. The operation is started by closing the power switch 56. The CPU 52 is initialized in a stage 101, followed by inhibiting an interrupt in a stage 102. The interrupt can occur only by actuating the automatic leveling switch 55. When the automatic leveling switch 55 is closed while the CPU accepts the interrupt, control is immediately transferred to an automatic leveling routine (described later). After the stage 102, the air compressor 28 is turned off in a stage 103, and then the first and second control valves 34, 35 and the release valve 36 are closed in a stage 104. In most cases, however, the air compressor and the valves are initially turned off and closed, and hence the CPU merely issues the above commands without changing anything during normal operation. The stages 103, 104 signify initialization of the air compressor 28 and the valves 34–36. Then, flow goes to a stage 105 which refers to an output signal OV of the voltage sensor 58 and ascertains whether the output signal OV is "1" or not, i.e., whether the voltage applied to the control device is in a range which permits the system to operate properly. If the voltage is not in the range, the execution of the program is stopped in a stage 106. If in the range, the second control valve 35 is opened in a step 107 to bring the central passage 44 of the valve unit 26 into communication with the rear pneumatic leveling units 22. Then, the CPU 52 waits about 2 seconds in a stage 108, during which time the air pressure in the central passage 44 and the air pressure in the rear pneumatic leveling units 22 are balanced, allowing the pressure sensor 37 to detect the air pressure in the rear pneumatic leveling units 22 accurately. The CPU 52 reads an output signal OPn from the pressure sensor 37 in a stage 109, and then processing proceeds to a stage 111 in which the second control valve 35 is closed. The first control valve 34 is then opened in a stage 112. The CPU 52 waits about 2 seconds in a stage 113, followed by a stage 114 in which the CPU 52 reads the output signal OPn from the pressure sensor 37, and a stage 115 in which the first control valve 34 is closed. In these four stages 112, 113, 114, 115, the air pressure in the front pneumatic leveling units 21 is read like the sequence of the stages 107, 108, 109, 111. Control proceeds to a stage 116 for displaying the read air pressures in the front and rear pneumatic leveling units 21, 22 on the front and rear pressure display sections of the pressure display panel 65. The processing then goes to a pressure checking routine.

Figure 3:
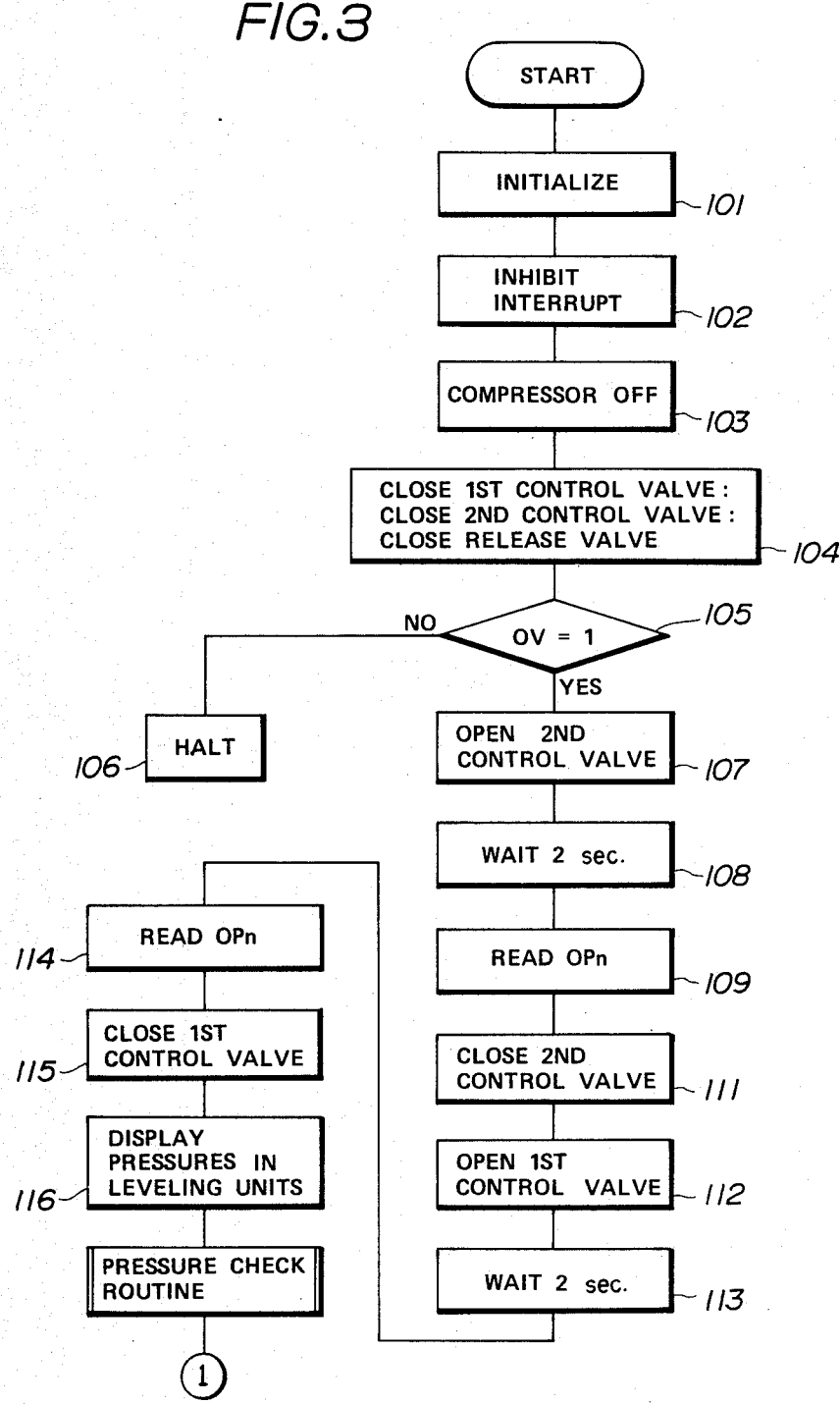
FIGS. 3 through 11 are flowchart pieces which are combined into the flowchart of a program for the control device of FIG. 2.
Figure 4:
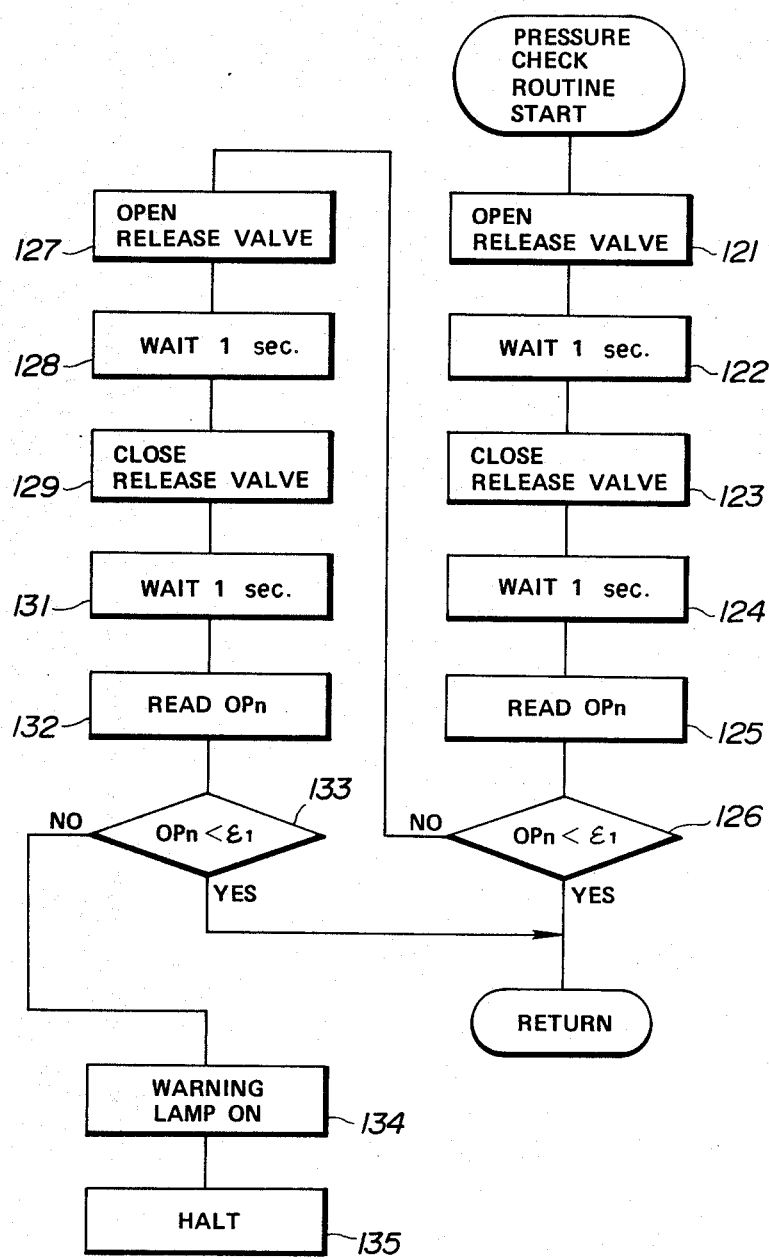

The pressure checking routine is a routine performed as one way of checking whether the vehicle leveling system can operate properly, and will repeatedly be effected while the vehicle leveling system is in operation. When the program enters this routine as shown in FIG. 4, the release valve 36 is opened in a stage 121, and the CPU 52 waits about 1 second, during which time the air pressure in the central passage 44 is brought into equilibrium with the pressure outside of the valve unit 26, i.e., the atmospheric pressure. Then, the release valve 36 is closed in a stage 123, and the CPU 52 waits about 1 second, followed by a stage 125 which reads the output signal OPn of the pressure sensor 37 into the CPU 52. Should the first and second control valves malfunction or be subject to pressure leakage, the air pressure in the central passage 44 would apparently be different from the atmospheric pressure. Flow goes to a stage 126 which ascertains whether the pressure indicated by the output signal OPn of the pressure sensor 37 is substantially equal to the atmospheric pressure ("0 kg/cm$^2$" in gage pressure), i.e., smaller than a sufficiently small value $\epsilon_1$. If substantially equal to the atmospheric pressure, then control returns to the main routine. If not, then control proceeds to a sequence of stages 127, 128, 129, 131, 132, which is identical to the sequence of stages 121 through 125. If the pressure detected by the pressure sensor 37 is substantially equal to the atmospheric pressure in the stage 133, then the processing returns to the main routine. If not, then the warning lamp 67 is caused to flicker for a given period of time in a stage 134, and the execution of the program is ended in a stage 135. According to the pressure checking routine, if the control valves appear to suffer from a malfunction in the stage 126, then the air pressure is measured again. The program is terminated, i.e., the vehicle leveling operation is interrupted, only when the control valves are subject to malfunctioning in the stage 133. Control having returned to the main routine proceeds through a connector (1) (FIG. 3) to a stage 141 shown in FIG. 5.

Figure 5:
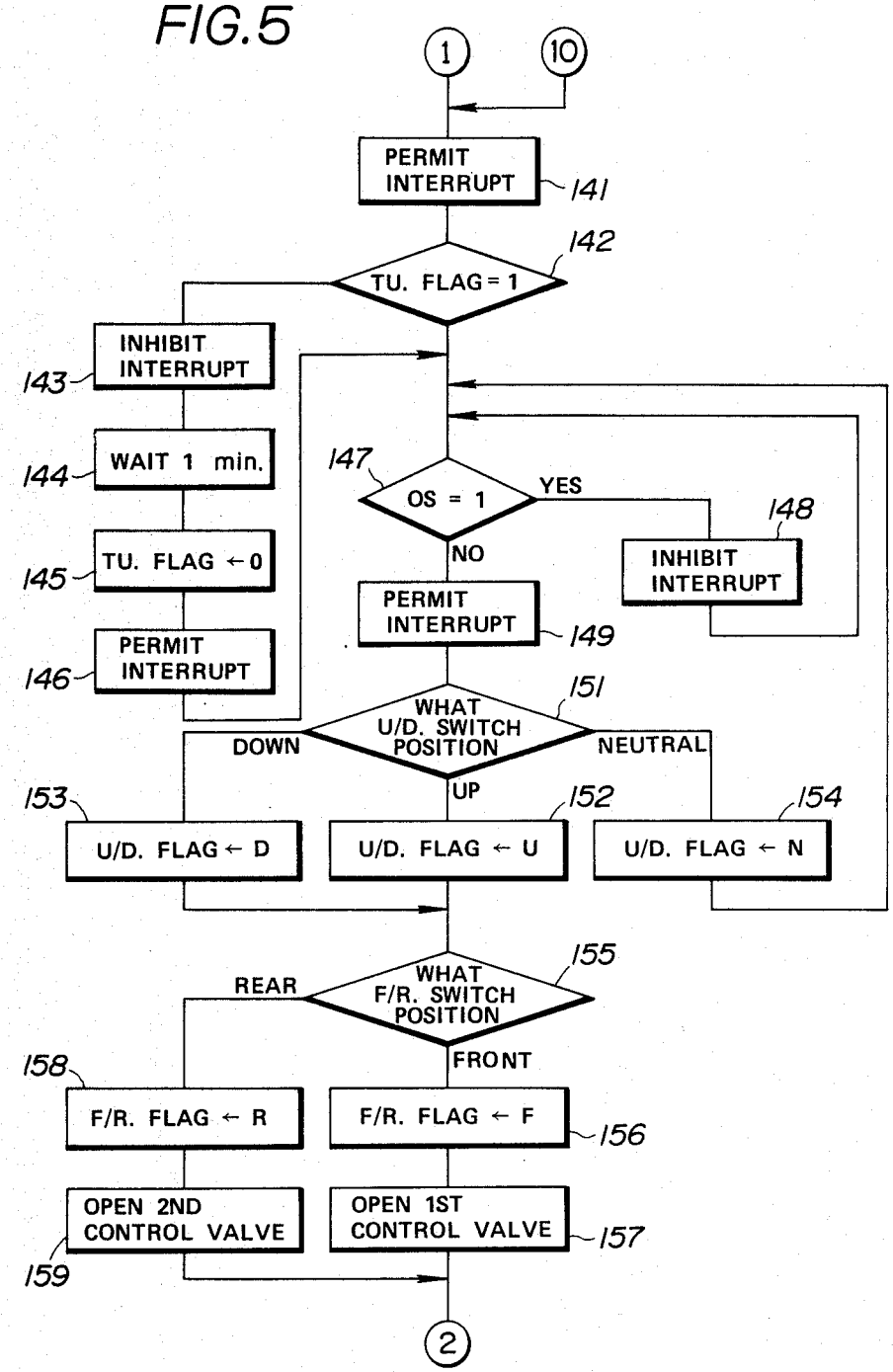

In the flowchart piece of FIG. 5, an interrupt is permitted in the stage 141, and a timeup flag (TU flag) is then referred to in a stage 142. The timeup flag will be described in greater detail later on. If the timeup flag is "1", then the interrupt is inhibited in a stage 143, the CPU 52 waits 1 minute in a stage 144, and the timeup flag is set to "0" in a stage 145. After the interrupt is permitted in a stage 146, the processing proceeds to a stage 147. If the timeup flag is "0" in the stage 142, the processing proceeds directly to the stage 147, which checks an output signal OS of the stand sensor 59. If the motorcycle stand is used or erected, the output signal OS of the stand sensor 59 is "1", and if not, the output signal OS is "0". If the output signal OS is "1", the interrupt is inhibited in a stage 148, and control returns to the stage 147. As long as the stand is used, flow remains in this loop, and no leveling operation is carried out. Any unwanted result or trouble which would otherwise occur from a leveling procedure during use of the stand is effectively prevented by the above process. If the output OS is "0" in the stage 147, the processing proceeds from the stage 147 to a stage 149 in which the interrupt is permitted. Then, the U/D switch 54 is checked for its position in a stage 151. If the U/D switch 54 is in a position to select an increase in the body height, then the U/D flag is set to "U" in a stage 152. If the U/D switch 54 a position to select a reduction in the body height then the U/D flag is set to D in stage 153. If the U/D flag switch 54 is in a position to disable manual leveling, then the U/D flag is set to "N", in stage 154. The processing returns from the stage 154 to the stage 147. Therefore, insofar as no leveling is performed, control remains in this loop while permitting the interrupt. If the automatic leveling switch 55 is closed during this time, the interrupt occurs and the processing proceeds to an automatic leveling routine. If the U/D switch 54 is in a position other than the neutral position which disables the manual leveling operation, then control goes through the stage 152 or 153 to a stage 155 which checks the F/R switch 53 for its position to start a manual leveling mode of operation. If the F/R switch 53 is in a position to select leveling of the front body portion of the motorcycle, flow goes from the stage 155 to a stage 156 in which the F/R flag is set to "F". Thereafter, the first control valve 34 is opened in a stage 157, and the processing goes through a connector (2) to a stage 161 shown in FIG. 6. If the F/R switch 53 is in a position to select leveling of the rear portion of the motorcycle, the processing goes from the stage 155 to a stage 158 which sets the F/R flag to "R". After the second control valve 35 is opened in a stage 159, the program goes through the connector (2) to the stage 161 of FIG. 6.

Figure 6:
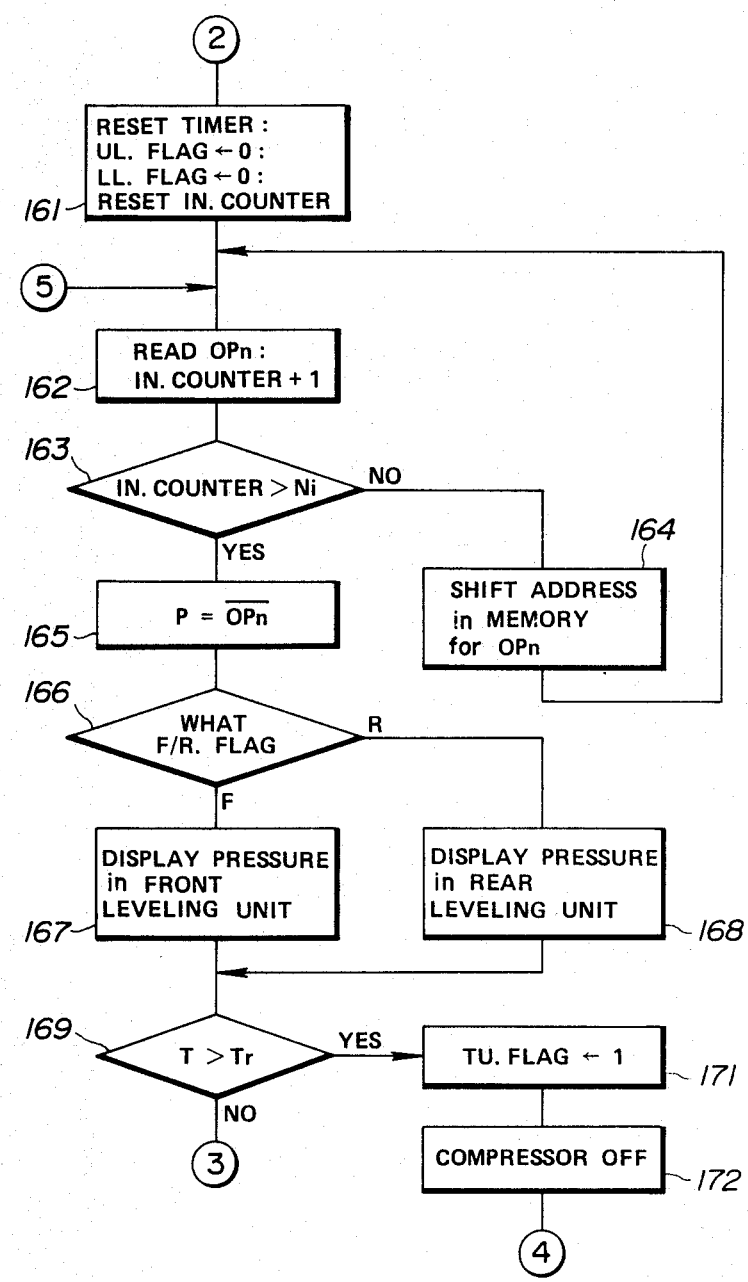

The flowchart piece of FIG. 6 starts with the stage 161 in which a timer is reset, UL and LL flags are set to "0", and an input counter is reset. These UL and LL flags are used to monitor the air pressures in the pneumatic leveling units 21, 22, and their functions will become apparent from the description of the flowchart below. The aforesaid timer is used to monitor a period of time in which the air compressor 28 is continuously operated. The timer is reset to start measuring the time when vehicle leveling, regardless of whether it is in the manual or automatic mode, is started. The time held in the timer is repeatedly referred to during one cycle of vehicle leveling operation. If the time exceeds a prescribed time, the vehicle leveling operation is brought to an end. Therefore, the time in which the air compressor 28 is continuously operated will not exceed the prescribed time. This timer will be described in more detail. The stage 161 is followed by a stage 162 which reads the output signal OPn of the pressure sensor 37 and increments the count of the input counter by "1". A next stage 163 compares the count of the input counter with a value Ni preset in the program. If the count is not in excess of the preset value Ni, then a memory address storing the output signal OPn of the pressure sensor 37 is shifted in a stage 164, and flow is looped back to the stage 162. The stages 162, 163, 164 thus constitute a loop which will be referred to as a readout loop. Before control enters the readout loop, the input counter has been reset in the stage 161, and hence the processing goes repeatedly through the readout loop as many times as the number corresponding to the preset value Ni, and as many output values OPn of the pressure sensor 37 are stored as that number. Then, the program proceeds from the stage 163 to a stage 165 in which the average P of the output values OPn is computed and stored. The preset value Ni is determined such that the processing goes cyclically through the readout loop in about 1 second. Therefore, the average P is an average value of the pressures in the pneumatic leveling units within about 1 second. This process removes adverse influences which would otherwise result from variations or irregularities of the air pressures in the pneumatic leveling units due to vibration of the motorcycle while it is running. As a consequence, the air pressures in the pneumatic leveling units which provide a basis for vehicle leveling control can accurately be detected. The processing then goes to a stage 166 which checks the F/R flag. If the F/R flag is "F", then the average air pressure in the front pneumatic leveling units 21 is displayed on the front display section of the display panel 65 in a stage 167. If the F/R flag is "R", then the average air pressure in the rear pneumatic leveling units 22 is displayed on the rear display section of the display panel 65 in a stage 168. Flow then goes from the stage 167 or 168 to a stage 169 which compares the time T held by the timer with a time Tr preset in the program. The preset time Tr is selected to be 1 minute in view of the ability of the air compressor 28 and the ability of the power source which supplies electric power to the air compressor 28. If the time T of the timer is longer than the preset time Tr, i.e., the preset time Tr has elapsed, then the timeup flag is set to "1". Then, after the air compressor 28 is inactivated, the processing proceeds through a connector (4) to a stage 203 illustrated in FIG. 7. If the preset time Tr has not elapsed, then the processing goes through a connector (3) to a stage 181 shown in FIG. 7.

Figure 7:
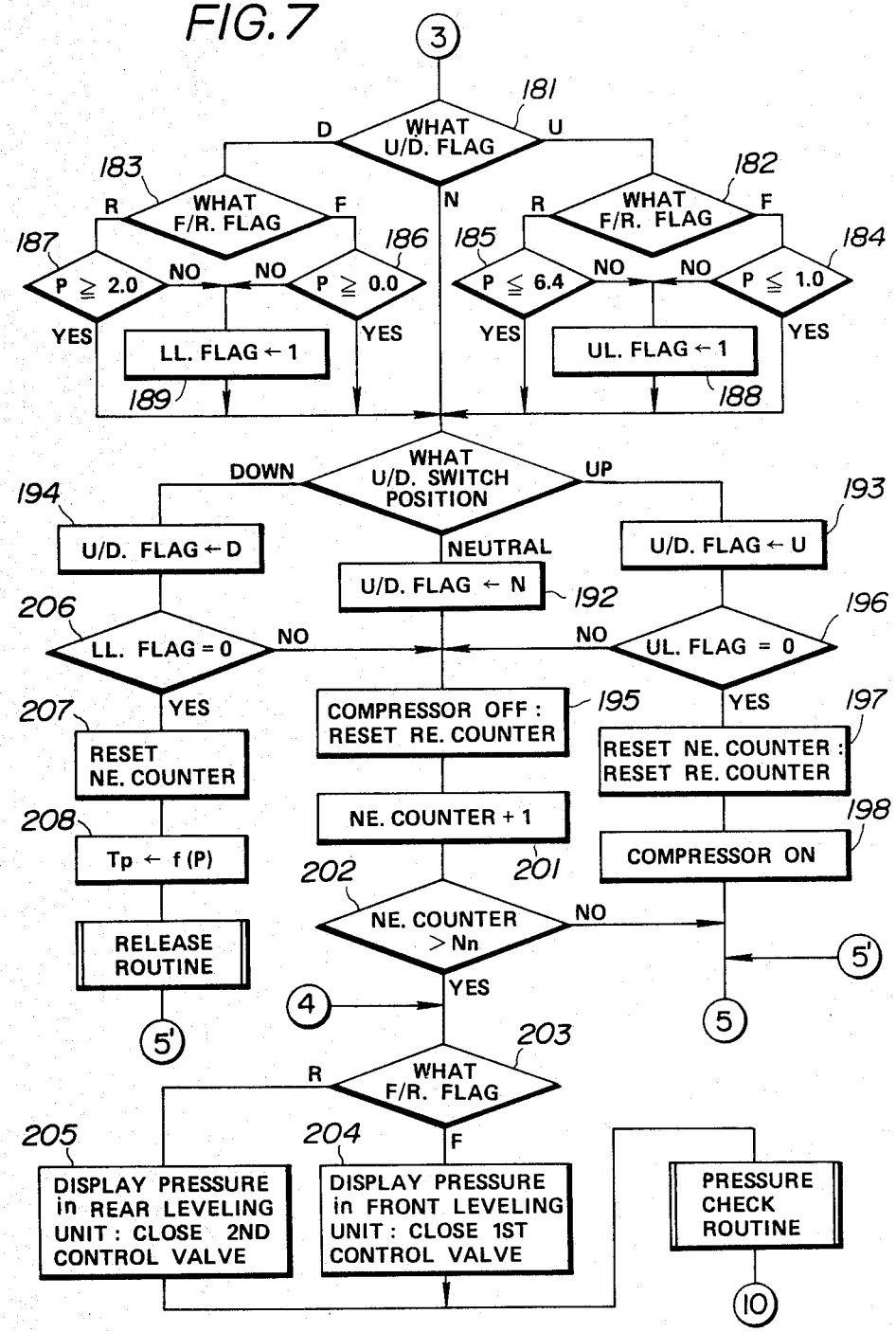

In the flowchart piece of FIG. 7, the U/D flag is first checked in the stage 181. If the U/D flag is "N", then flow goes from the stage 181 directly to a stage 191. If the U/D flag is "U", then the F/R flag is checked in a stage 182, and if the U/D flag is "D", then the F/R flag is checked in a stage 183. The U/D flag and the F/R flag are checked in these stages 181, 182, 183 to ascertain whether the air pressures in the pneumatic leveling units are in a proper pressure range. If the U/D flag is "U", the vehicle height is to be increased, and the stage 182 and a following stage 184 or 185 ascertains whether the air pressure in the pneumatic leveling units is in excess of the upper limit of the proper pressure range. If the U/D flag is "D", the vehicle height is to be reduced, and the stage 183 and a following stage 186 or 187 ascertains whether the air pressure in the pneumatic leveling units is below the lower limit of the proper pressure range. The proper pressure range depends on the structure of the front forks including the front pneumatic leveling units, and also on the structure of the rear cushions including the rear pneumatic leveling units. In the illustrated vehicle leveling system, the proper pressure range for the front pneumatic leveling units is from 0.0 kg/cm$^2$ to 1.0 kg/cm$^2$, and the proper pressure range for the rear pneumatic leveling units is from 2.0 kg/cm$^2$ to 6.4 kg/cm$^2$. If the front body portion of the motorcycle is to be leveled, the F/R flag is "F", and therefore control goes from the stage 182 to the stage 184 which compares the pressure P computed in the stage 165 with the upper limit (1.0 kg/cm$^2$) of the proper pressure range for the front pneumatic leveling units. If the pressure P is higher than the upper limit, then the UL flag is set to 1 in a stage 188, and the processing goes to the stage 191. If the pressure P is equal to or lower than the upper limit in the stage 184, the program goes directly to the stage 191. If the rear body portion of the motorcycle is to be leveled, the F/R flag is "R", and therefore control goes from the stage 182 to the stage 185 which compares the pressure P with the upper limit (6.4 kg/cm$^2$) of the proper pressure range for the rear pneumatic leveling units. If the pressure P is higher than the upper limit, then the UL flag is set to 1 in the stage 188, and the processing goes to the stage 191. If the pressure P is equal to or lower than the upper limit in the stage 185, the program goes directly to the stage 191. The stages 183, 186, 187, 189 compare the pressure P with the lower limits (0.0 and 2.0 kg/cm$^2$) of the proper pressure ranges for the front and rear pneumatic leveling units in a manner similar to the stages 182, 184, 185, 188. If the pressure P is lower than the lower limits, then the LL flag is set to "1" in a stage 189.

The stage 191 checks the U/D switch for its position. The processing goes from the stage 191 to a stage 192, 193 or 194 dependent on the selected position of the U/D switch. The processing carried out by the stages 191, 192, 193, 194 is the same as the processing of the stages 151, 152, 153, 154 in FIG. 5. After the U/D flag is set to "N" in the stage 192, the air compressor 28 is turned off and a release counter (described later) is reset in a stage 195. The air compressor is not necessarily in operation when control proceeds to the stage 195. The CPU 52 actually issues a command to stop the air compressor 28. In many cases, the air compressor 28 has already been stopped when the CPU 52 issues such a command. The air compressor is in operation only when the vehicle height is increased.

Flow of the processing for increasing the vehicle height will be described below. When such flow is to be executed, the U/D switch has been shifted to the position to increase the vehicle height, and hence the U/D flag is set to "U" in the stage 193. The UL flag is referred to in a stage 196. If the UL flag is "1", i.e., if the air pressure in the pneumatic leveling units is higher than the upper limit of the proper pressure range, then the processing goes to the stage 195 which inactivates the air compressor 28, so that the vehicle height will not be increased. If UL flag is "0", then a neutral counter (described later) and the release counter are reset in a stage 197. The air compressor 28 is actuated in a stage 198 to supply air into the pneumatic leveling units for thereby raising the vehicle body. From the stage 198, control goes through a connector 5 to the stage 162 of FIG. 6. The loop from the stage 162 via the stages 181, 193 to the stage 198 will be referred to as a raising loop. The program leaves the raising loop when (1) the stage 191 detects return of the U/D switch to the neutral position, (2) the stage 196 detects the leveling unit pressure in excess of the upper limit, (3) the stage 169 detects that the time in which the air compressor 28 is continuously operated exceeds the preset time, and (4) the interrupt occurs through the automatic leveling switch 55.

If the processing leaves the raising loop through the above event (1) or (2), it proceeds to the stage 195 as described above, and then the count held by the neutral counter is incremented by "1" in a stage 201 which is followed by a stage 202 which compares the count of the neutral counter with a value Nn preset in the program. If the count is greater than the preset value Nn, then flow is looped through the connector 5 back to the stage 162 of FIG. 6. The loop from the stage 162 via the stages 181, 192 to the stage 202 will be referred to as a neutral loop. When the processing is in the neutral loop, the neutral counter is reset in the stage 197 each time the processing goes through the neutral loop once. After the processing has been transferred from the raising loop to the neutral loop, the processing will leave the neutral loop by proceeding from the stage 202 to a stage 203 after the processing goes through the neutral loop as many times as the number corresponding to the preset value Nn. The preset value Nn is determined such that the time in which the processing stays in the neutral loop is about 2 seconds. Since the neutral loop includes the stage 191 which queries as to the position of the U/D switch, the processing is transferred to the raising loop when the U/D switch is shifted to the position to increase the vehicle height before 2 seconds elapse after the processing enters the neutral loop. Likewise, when the U/D switch is shifted to the position to reduce the vehicle height before 2 seconds elapse after the processing enters the neutral loop, the processing is transferred from the neutral loop to a lowering loop for reducing the vehicle height.

When the U/D switch remains in the neutral position for 2 seconds, the processing proceeds from the stage 202 to the stage 203, thus leaving the neutral loop. The stage 203 checks the F/R flag. If the front body portion has been leveled thus far, the F/R flag is "F", and the program goes from the stage 203 to a stage 204 in which the air pressure in the front pneumatic leveling units is displayed and the first control valve 34 is closed. Subsequently, the processing goes to the pressure checking routine. If the rear body portion has been leveled thus far, the F/R flag is "R", and the program goes from the stage 203 to a stage 205 in which the air pressure in the rear pneumatic leveling units is displayed and the second control valve 35 is closed, followed by the processing going to the pressure checking routine. The processing goes to the stage 204 or 205 and then the pressure checking routine after the processing has been stayed in the neutral loop for 2 seconds. Therefore, when the vehicle height is increased or reduced excessively, it can immediately be readjusted conveniently without executing the pressure checking routine if the readjustment occurs within 2 seconds after such a vehicle leveling operation. The processing, having returned from the pressure checking routine, is looped through a connector 10 back to the stage 141 of FIG. 5.

Since the U/D switch has been shifted to the vehicle lowering position, the LL flag is checked in a stage 206 after the processing proceeds from the stage 191 to the stage 194. If the LL flag is "1", i.e., indicating that the leveling unit pressure is lower than the lower limit, then the vehicle height is not reduced and the processing goes to the stage 195, entering the neutral stage. If the LL flag is "0", then the processing proceeds to a stage 207 which resets the neutral counter. After a variable Tp has been set to a value in a stage 208, control proceeds to a release routine. The processing, having returned from the release routine, is looped through a connector (5') and the connector (5) to the stage 162 of FIG. 6. The loop from the stage 162 through the stages 181, 194 to the stage 208 will be referred to as a lowering loop. The value of the variable Tp is selected dependent on the pressure P computed in the stage 165, and is referred to in the release routine. The variable Tp will be described in more detail in the release routine.

Figure 8:
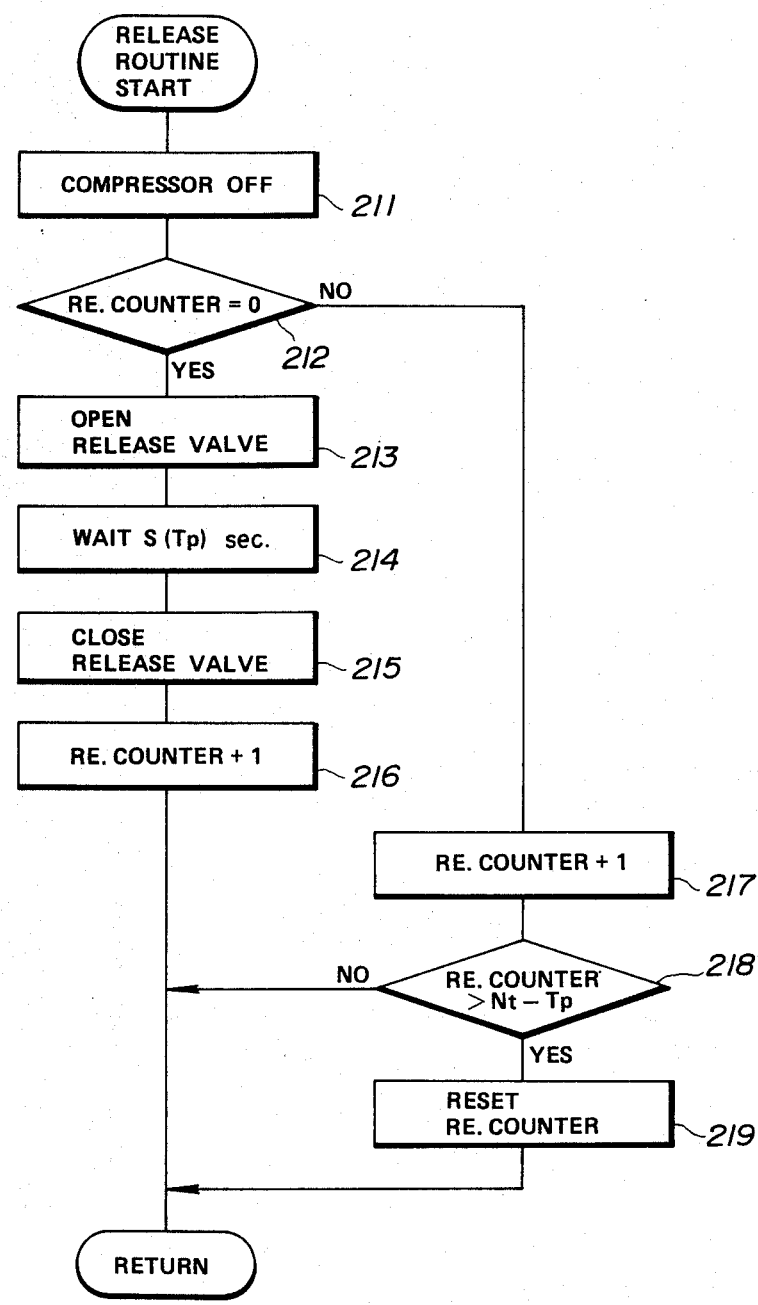

FIG. 8 is a flowchart piece showing the release routine. The release routine will also be used in an automatic leveling routine, described later on. When the release routine is started, the air compressor 28 is turned off in a stage 211, and then the count of the release counter is checked in a stage 212. If the count of the release counter is "0", the processing proceeds to a stage 213 which opens the release valve 36 in a stage 213 to vent the central passage 44 of the valve unit 26 to the atmosphere through the fourth port 48. Because one of the first and second control valves 34, 35 which is selected by the F/R switch is open at this time, the air in the pneumatic leveling units to be operated for vehicle leveling is discharged through the release valve 36 for thereby lowering the vehicle height. The air is continuously discharged while the CPU 52 waits in a stage 214. The air is then prevented from being discharged when the release valve 36 is closed in a stage 215. The time for which the CPU 52 waits is S(Tp) seconds dependent on the variable Tp. The resistance to flow of the air discharged from the pneumatic leveling units to the fourth port 48 of the valve unit 26 is constant. Therefore, the speed of flow of the discharged air is high when the leveling unit pressure is high, and is low when the leveling unit pressure is low. In view of this, the value to which the variable Tp is set in the stage 208 of FIG. 7 is selected such that the time for which the air is discharged will be shorter when the pressure P in the pneumatic leveling units is higher and will be longer when the pressure P is lower so that the rate of reduction of the pressure will substantially be constant in one air discharge cycle. Values f(P) for the variable which give proper air discharge times with respect to air pressures are preset in the program. The time for one air discharge cycle is 1 second or shorter. The processing then goes from the stage 215 to a stage 216 which increments the count of the release counter by "1". Then, flow returns from the release routine to the original routine from which the processing has entered the release routine. If the count of the release counter is not "0" in the stage 212, the processing goes to a stage 217 in which the count of the release counter is incremented by "1". Thereafter, the count of the release counter is checked in a stage 218 for comparison with a numerical value Nt−(minus) Tp. The value Nt is preset in the program. If the count of the release counter is in excess of the value Nt−Tp, then release counter is reset in a stage 219, and the processing returns directly to the original routine. If not, then the processing returns from the stage 218 directly to the original routine. When the processing in the lowering routine first enters the release routine, the processing proceeds from the stage 212 to the stage 213 to discharge the air from the pneumatic leveling units. In the second cycle in the lowering loop, the processing goes from the stage 212 to the stage 217, and cycles in the lowering loop without discharging the air until the count of the release counter exceeds the numerical value Nt−Tp. If the count of the release counter exceeds the numerical value Nt−Tp, then the release counter is reset. Therefore, the processing proceeds from the stage 212 to the stage 213 in the next cycle for discharging the air. The interval from the starting of an air discharge to the starting of a next air discharge depends on the value Nt. The value Nt is selected such that the above interval will be about 1 second.

In the above manual vehicle leveling mode, the driver of the motorcycle can adjust the height of the motorcycle body while watching the displayed air pressures in the pneumatic leveling units which effect a height increase or reduction since they are updated at intervals of about 1 second. When the motorcycle body is lowered, particularly, the speed at which the air pressure is lowered is kept substantially constant irrespectively of the air pressure in the pneumatic leveling units because of the aforesaid control of the air discharge time. Therefore, the manual leveling operation can be performed conveniently. The raising, neutral, and lowering routines do not contain a process for rewriting the F/R flag. While the processing is in these loops, therefore, the vehicle leveling operation is not affected by operation of the F/R switch. Stated otherwise, any command from F/R switch as it is shifted to the CPU 52 is ineffective during the vehicle leveling operation. This is also advantageous in making the vehicle leveling process convenient.

The automatic leveling routine will now be described with reference to FIGS. 9 through 11. When the automatic leveling switch 55 is operated while an interrupt is permitted with respect to the processing executed by the CPU 52, control immediately enters the automatic leveling operation.

Figure 9:
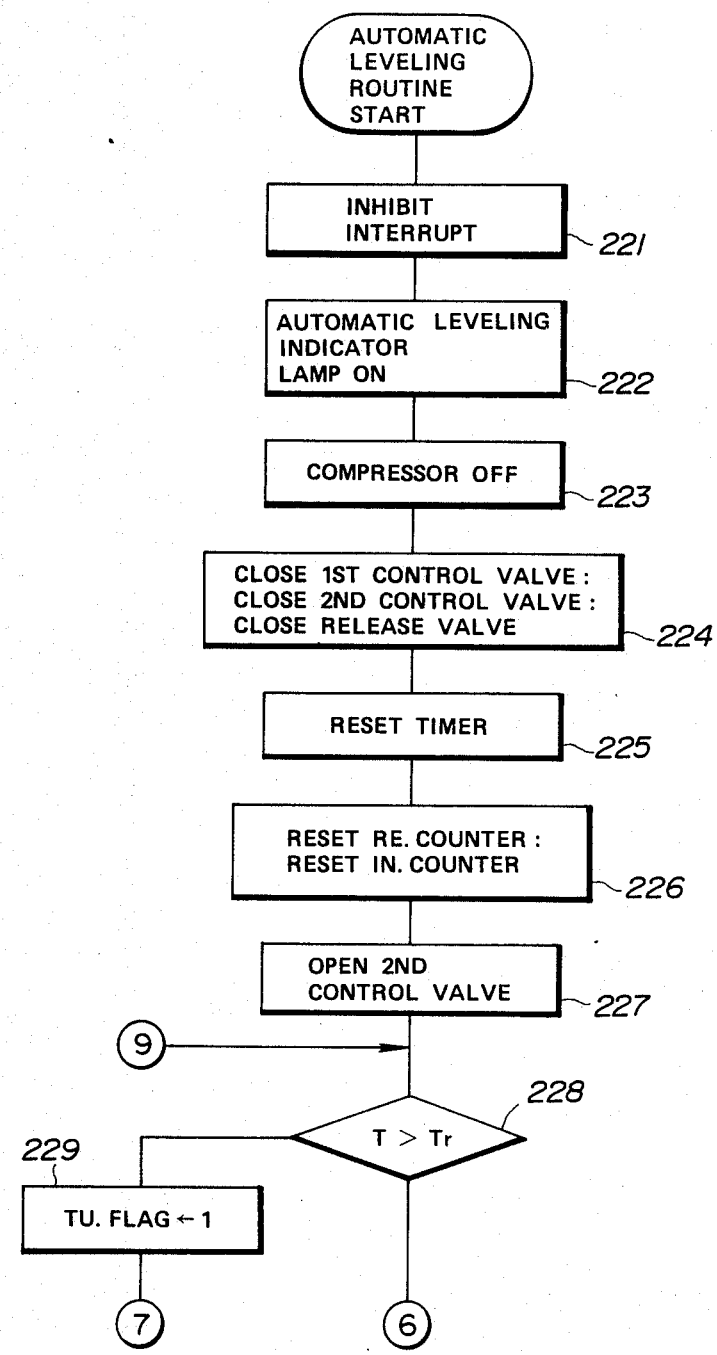

The automatic leveling routine starts with a stage 221 in FIG. 9. The stage 221 inhibits an interrupt, and then the automatic leveling indicator lamp 66 starts to flicker in a stage 222. The automatic leveling indicator lamp 66 continues to flicker insofar as the processing is in the automatic leveling mode. The compressor 28 is turned off in a stage 223, and the first and second control valves 34, 35 and the release valve 36 are closed in a stage 224. Thereafter, the timer is reset in a stage 225, and the release counter and the input counter are reset in a stage 226. The second control valve 25 is opened in a stage 227 to provide communication between the central passage 44 and the rear pneumatic leveling units 22. Control then goes to a step 228 which compares the time held by the timer with the preset time Tr to ascertain whether the preset time has elapsed or not. The preset time has never elapsed when the processing proceeds from the stage 227 to the stage 228, but may have elapsed when the processing proceeds from a connector (9) to the stage 228. When the preset time has elapsed, the timeup flag is set to "1", and then flow goes through a connector (7) to a stage 271 of FIG. 11. If the preset time has not elapsed, the processing proceeds from the stage 228 through a connector (6) to a stage 231 of FIG. 10.

Figure 10:
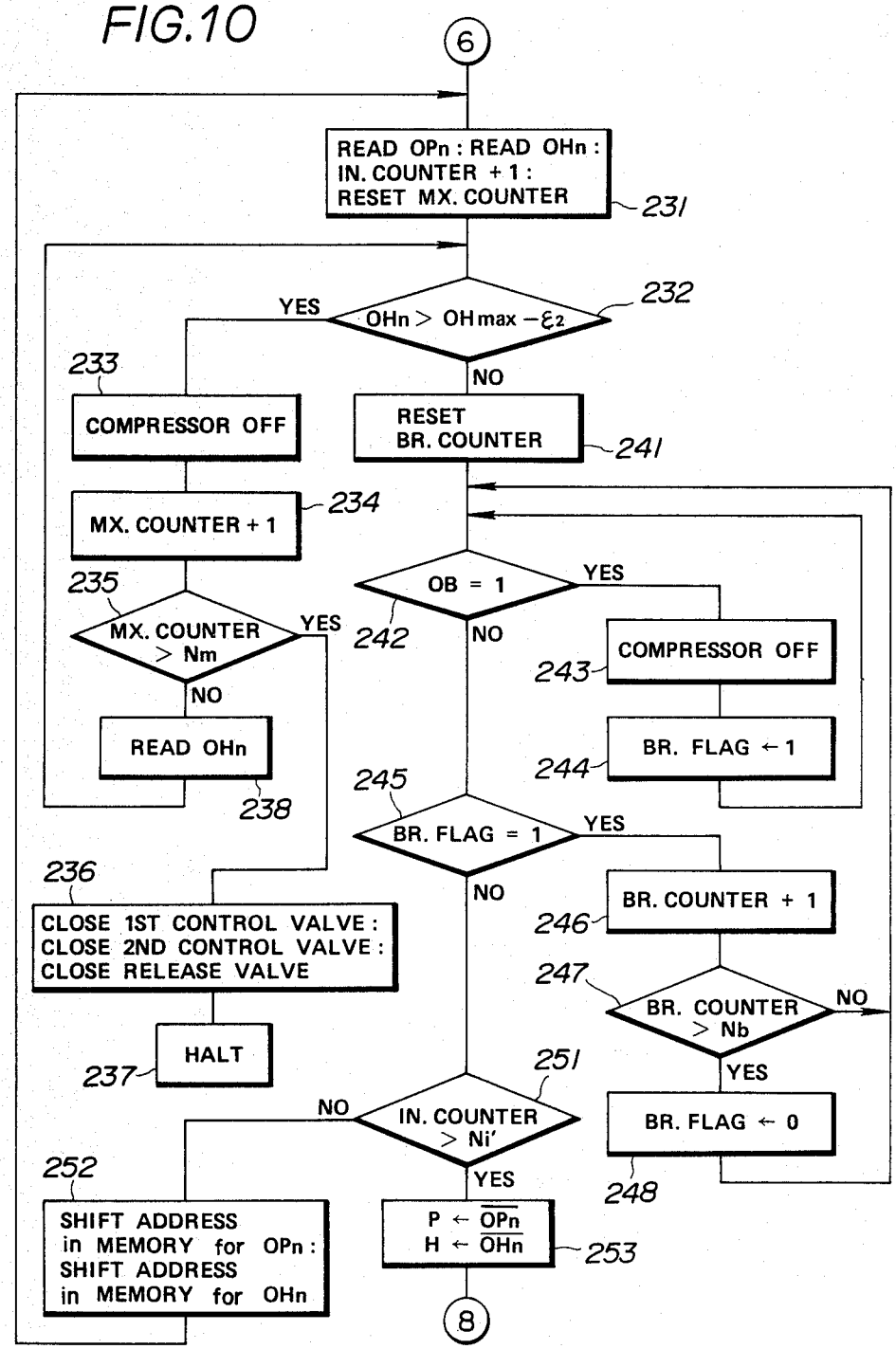

In FIG. 10, the stage 231 reads the output signal OPn of the pressure sensor 37 and an output signal OHn of the height sensor 57, resets a maximum height detecting counter, and increments the count of the input counter by "1". The output value OHn of the height sensor 57 is compared in a stage 232 with a value OHmax−(minus)$68_2$ which is slightly smaller than a maximum possible output value OHmax of the height sensor 57. The height sensor 57 is arranged to issue a larger output value as the vehicle height is greater. The maximum possible output value is generated by the height sensor 57 when the rear suspension is fully extended such as when the motorcycle falls on its side. If the output value OHn of the height sensor 57 is larger than the value OHmax−$\epsilon_2$, then the processing proceeds to a stage 233 which turns off the air compressor 28, followed by a stage 234 in which the count of the maximum height detecting counter by "1". Then, the count is incremented by of the maximum height detecting counter is compared with a value Nm preset in the program. If the count exceeds the preset value Nm, then the first and second control valves 34, 35 and the release valve 36 are closed in a stage 236, and the execution of the program is brought to an end in a stage 237. If the count of the maximum height detecting counter is not in excess of the preset value Nm in the stage 235, control goes to a stage 238 which reads the output value OPn of the height sensor 57. Since this height value OPn thus read is stored in the address in which the height value read in the stage 231 has been stored, the stored height value is updated. Then, the stage 238 loops the processing back to the stage 232. As long as the rear suspension is fully extended, the processing cycles in this loop. When the processing cycles in this loop as many times as the number corresponding to the preset value Nm, the vehicle leveling system stops its operation. The preset value Nm is determined such that the vehicle leveling system will be inactivated when the time for which the rear suspension remains fully extended exceeds 5 seconds.

If the output value OHn of the height sensor 57 is not in excess of the value OHmax$-\epsilon_2$ in the stage 232, the processing goes to a stage 241 which resets a brake counter and then to a stage 242 which checks an output signal OB of the brake sensor 61. The output signal OB of the brake sensor 61 is "1" when the motorcycle is braked, and "0" when the motorcycle is not braked. When the motorcycle is braked, the processing goes to a stage 243 which turns off the air compressor 28 and then to a stage 244 which sets a brake flag to "1". Thereafter, the processing is looped back to the stage 242. The loop composed of the stages 242, 243, 244 will be referred to as a first braking loop. While the motorcycle is being braked, the processing cycles in the first braking loop. When the motorcycle is released off the brake and the output OB of the brake sensor 61 becomes "0", flow goes from the stage 242 to a stage 245 which checks the brake flag. If the brake flag is "1", then the processing proceeds to a stage 246, and if "0", then the processing proceeds to a stage 251. The stage 246 increments the count of the brake counter by "1". The processing goes from the stage 246 to a stage 247 which compares the count of the brake counter with a value Nb preset in the program. If the count is not in excess of the value Nb, then the processing is looped from the stage 247 to the stage 242. If the count exceeds the value Nb, then the processing goes from the stage 247 to a stage 248 in which the brake flag is set to "0", followed by looping the processing back to the stage 242. The loop including the stages 242, 246 will be referred to as a second braking loop. Immediately after the braking of the motorcycle has been finished, the processing goes from the first braking loop to the second braking loop and cycles in the second braking loop for a time dependent on the preset value Nb. Thereafter, the processing proceeds to the stage 251. The preset value Nb is determined such that the time for which the processing remains in the second braking loop is about 3 seconds. While the motorcycle is being braked and during 3 seconds after the motorcycle has been braked, no other processing than the first and second braking loops is executed for effectively preventing brake-induced variations of wheel loads from affecting the vehicle leveling operation during travel of the motorcycle.

The stage 251 compares the count of the input counter with a value Ni' preset in the program. If the count of the input counter is not in excess of the preset value Ni', then memory addresses storing the output value OPn of the pressure sensor 37 and the output value OHn of the height sensor 57 are shifted in a stage 252. Then, the processing is looped back to the stage 231. This loop will be referred to as a readout loop for the automatic leveling mode. The processing cycles in this readout loop as many times as the number corresponding to the preset value Ni', and a series of as many pressure readout values as that number are stored in a memory of the CPU 52. Furthermore, a series of as many height readout values as that number are also stored in the CPU memory. The preset value Ni' is determined such that the time required for the processing to complete the repetitive readout process without entering the first and second braking loops is about 1 second. The repetitive readout process is completed when the count of the input counter is in excess of the preset value Ni' in the step 251. Then, the processing proceeds to a stage 253 which computes the averages P, H of the series of readout values and stores them in the memory. These averages are therefore averaged for in 1 second except during the time for which the motorcycle is braked and 3 seconds after the motorcycle has been braked, if the motorcycle is braked. The memory address for the pressure average P is the same as the memory address for the pressure average computed in the stage 165 of FIG. 6, if the latter pressure average is for the rear pneumatic leveling units. Therefore, the pressure average is updated in the memory by the stage 253. Then, the processing goes to a stage 261 shown in FIG. 11.

Figure 11:
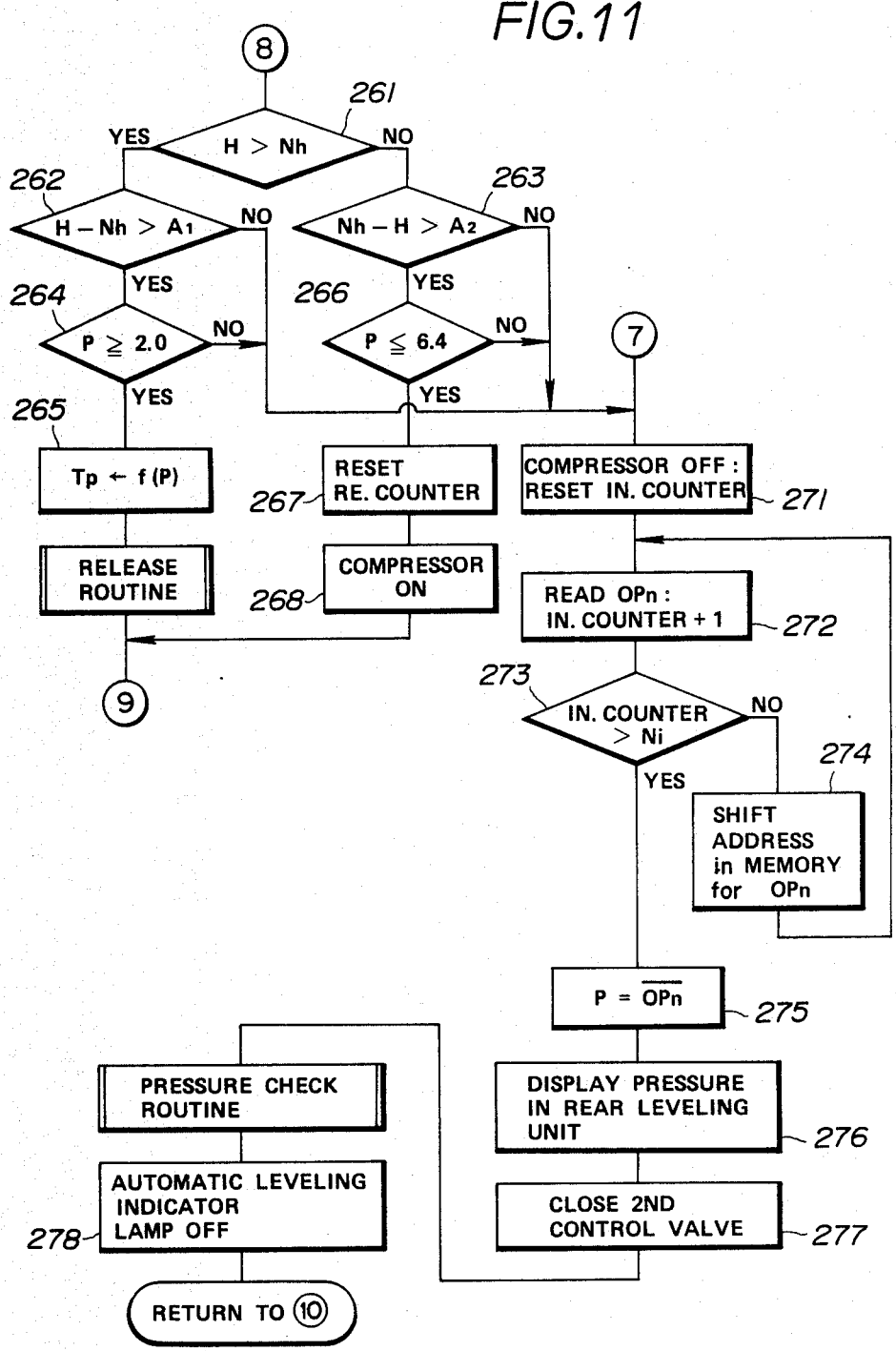

As illustrated in FIG. 11, the stage 261 compares the stored height value H with a value Nh preset in the program. The preset value H corresponds to a reference height position for the automatic leveling operation. The automatic leveling operation is terminated when the average output value from the height sensor 57 falls in a range from Nh$-$A2 to Hh$+$A1. If the stored height value is in excess of the preset value Hh, then the processing proceeds to a stage 262 which compares the value H$-$Hh and the numerical value A1. If the stored height value does exceed the preset value Nh, then control goes to a step 263 which compares the value Hh$-$H and the numerical value A2. These stages 262, 263 serve to ascertain whether the height value is in the above height range for termination of the automatic leveling operation. If the height is in this range, then the processing proceeds from the stage 262 or 263 to the stage 271 in which no actual leveling operation is performed. If the present height is not within the height range for termination of the automatic leveling operation in the stage 262, i.e., if the present height is higher than the reference height, then flow proceeds to a stage 264 which compares the stored pressure P with the lower pressure limit 2.0 kg/cm$^2$ for the rear pneumatic leveling units. If the stored pressure P is below the lower pressure limit, then the processing proceeds to the stage 271 without performing the actual automatic leveling operation. If the stored pressure P is equal to or higher than the lower pressure limit in the step 264, then flow goes to a stage 265 which sets the variable Tp to a value in the same manner as the stage 208 of FIG. 7. Thereafter, the processing goes to the release routine shown in FIG. 8. From the release routine, the processing is looped through a connector 9 to the stage 228 of FIG. 9. If the height value is not within the height range in the stage 263, i.e., if the present height is lower than the reference height, then flow proceeds to a stage 266 which compares the stored pressure P with the upper pressure limit 6.4 kg/cm$^2$ for the rear pneumatic leveling units. If the stored pressure P is higher than the upper pressure limit, then the processing proceeds to the stage 271 without performing the actual automatic leveling operation. If the stored pressure P is equal to or lower than the upper pressure limit in the step 266, then flow goes to a stage 267 which resets the release counter and then a stage 268 which actuates the air compressor 28. Thereafter, the processing is looped to the stage 228 of FIG. 9 through the connector 9. Reference should be made to the description of the raising and lowering loops in the manual leveling mode as described above for the functions of the loop including the stages 228, 231, 253, 263 and 268 and the loop including the stages 228, 231, 253, 262 and 265. The stages 264, 266 check whether the leveling unit pressure is higher than the upper pressure limit and lower than the lower pressure limit even if the vehicle height is too low or high with respect to the reference height in the stages 263, 262. Thus, the leveling unit pressure is always kept in its proper pressure range.

In the stage 271, the air compressor 28 is inactivated and the input counter is reset. A following stage 272 reads out the output value OPn from the pressure sensor 37 and increments the count of the input counter by "1". Then, a stage 273 compares the count of the input counter with the preset value Ni. If the count is smaller than the preset value Ni, then the processing goes to a step 274 which shifts the memory addresses for the pressure readout values and then loops the processing back to the stage 272. If the count is larger than the preset value Ni, then control goes to a stage 275 which computes the average of the pressure readout values. The functions of these four stages 272, 273, 274, and 275 are the same as those of the stages 162, 163, 164, and 165. The processing then proceeds from the stage 275 to a stage 276 which displays the stored pressure value on the rear pressure display section of the pressure display panel 65. Then, a stage 277 closes the second control valve 35 to shut off the communication between the rear pneumatic leveling units 22 and the valve unit 26. The processing thereafter goes to the pressure checking routine shown in FIG. 4. After having returnd from the pressure checking routine, control proceeds to a stage 278 which de-energizes the indicator lamp 66. The automatic leveling routine is now terminated. The processing returns through a connector 10 back to the stage 141 shown in FIG. 5.

Modifications of the embodiment described as above will hereinafter be described. Only modified portions will be described below; other portions which will not be described remain the same as those of the foregoing embodiment.

Figure 12:
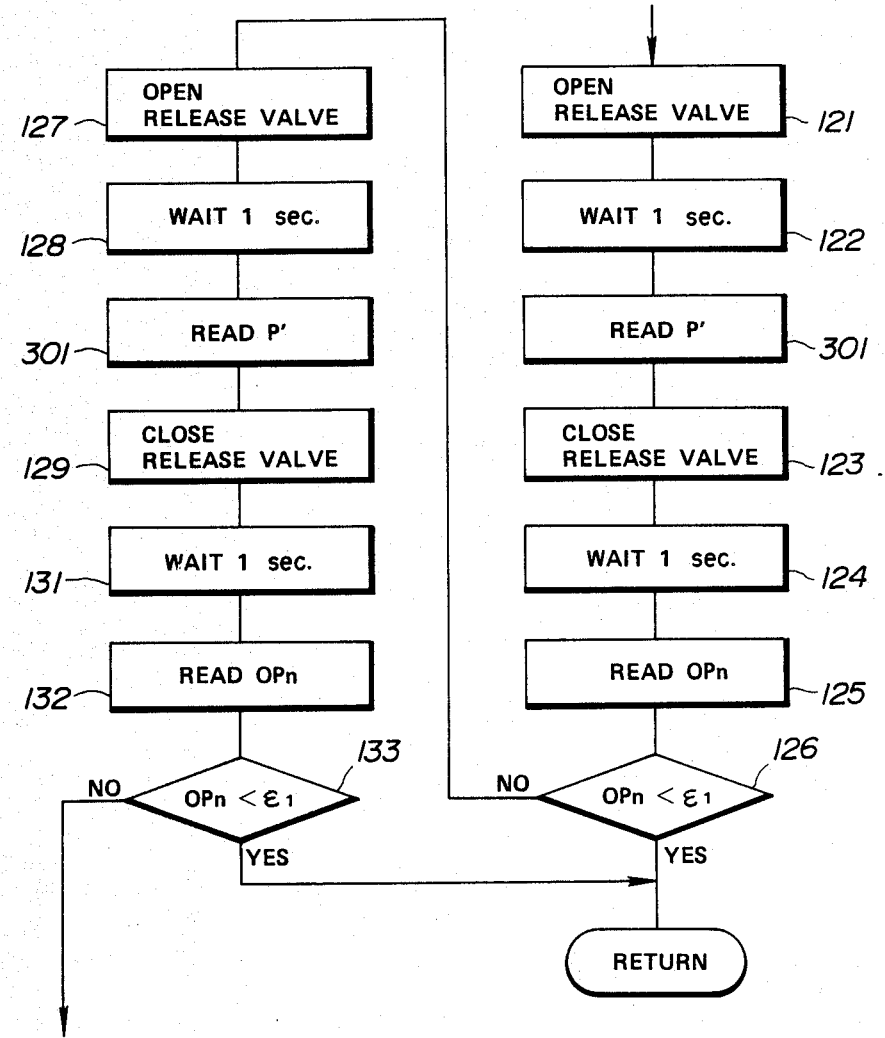
FIG. 12 is a flowchart piece of a modified portion of the program for a first modification of the vehicle leveling system of FIG. 1.

The first modification contains a program for calibrating the pressure sensor. As shown in FIG. 12, this program includes a stage 301 inserted between the stages 122, 123 described with reference to FIG. 4, and a stage 302 inserted between the stages 128, 129 in FIG. 4. In each of the stages 301, 302, the air pressure in the central passage 44 of the valve unit 26, which pressure has been brought into equilibrium with the atmospheric pressure through the release valve 36 as opened, is measured by the pressure sensor 37 before the release valve 36 is closed. An output value P' of the pressure sensor 37, indicating the measured pressure is stored in a memory address alotted thereto. According to this first modifiation, furthermore, values obtained by subtracting the output value P' from the pressure sensor outputs read out in the pressure readout stages 125, 132, 162, 231, 272 are utilized as stored pressure values. Since the stored pressure readout values are calibrated with reference to the pressure sensor output P' produced when the central passage 44 of the valve unit 26 is vented to the atmosphere, a pressure sensor with its output values tending to fluctuate or a pressure sensor with its output values tending to deviate from proper values due to time-dependent or environmental changes is allowed to function sufficiently by this modified arrangement.

According to a second modification, the number of cycles in which the processing goes through the readout loop and the execution time required to execute the cycles in the readout loop are varied. The number of cycles and the execution time depend on the preset value Ni to be compared with the count of the input counter in the stage 163 and the preset value Ni' to be compared with the count of the input counter in the stage 251. In the previous embodiment, these preset values are determined such that the execution time of the repeated cycles in the loop will be about 1 second (the preset value Ni' is employed when the processing does not enter the braking loop). With the second modification, the preset value Ni is smaller than that of the previous embodiment, and the preset value Ni' is larger than that of the previous embodiment. Therefore, the air pressure at the time of manually leveling the motorcycle is read out in a time shorter than 1 second through a smaller number of loop cycles, and the air pressure at the time of automatically leveling the motorcycle is read out in a time longer than 1 second through a greater number of loop cycles. Since the displayed air pressure is relied upon for vehicle height adjustment in the manual leveling mode, it is preferable that the displayed air pressure follow more closely variations in the air pressure within the pneumatic leveling units as the air is supplied into and discharged from the pneumatic leveling units. As a consequence, it is advantageous to reduce the preset value Ni in this manner where any delay of the response time of a pneumatic circuit system used is not negligible. Automatic leveling is often performed while the motorcycle is running, and it is necessary in such an instance to remove fluctuations of the leveling unit pressure due to vibration of the body of the motorcycle as it runs. It is advantageous to increase the preset value Ni' where the suspension used is soft and requires a longer time to dampen the vibration imposed thereon.

Figure 13:
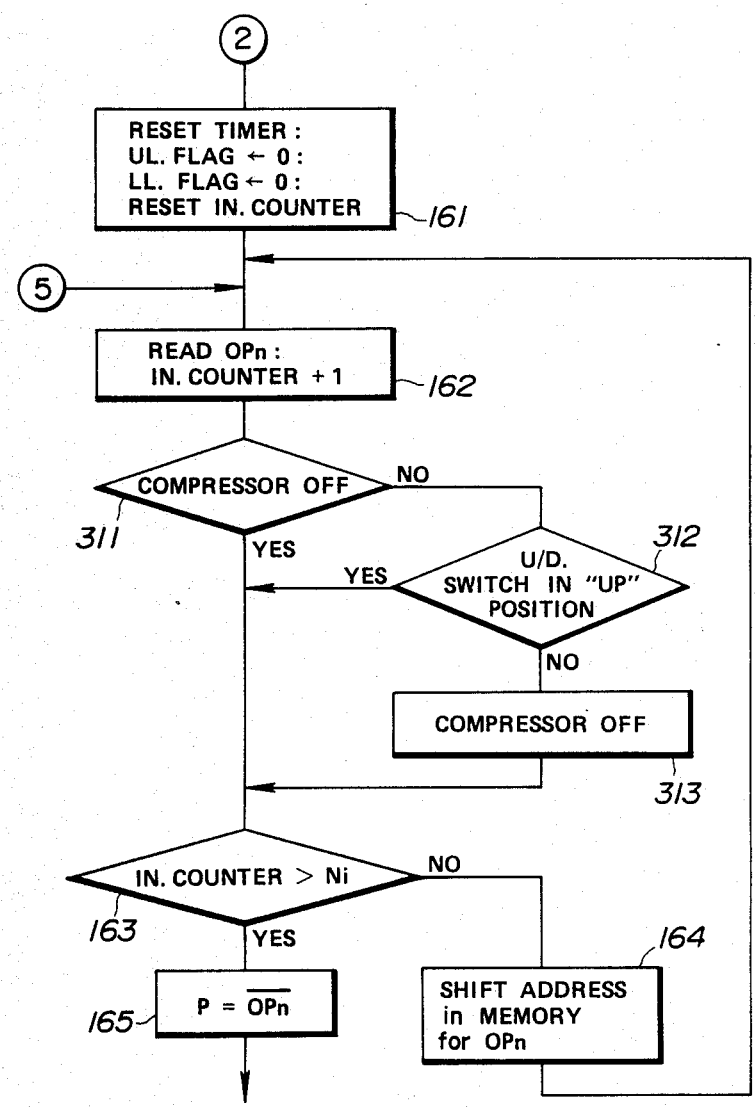
FIG. 13 is a flowchart piece of a modified portion of the program for a third modification of the vehicle leveling system of FIG. 1.

FIG. 13 shows a flowchart directed to a third modification which includes a program for inactivating the air compressor 28 immediately when the U/D switch is shifted from the position for selecting a height increase to the position for selecting the disabling of a vehicle leveling operation during the manual leveling mode of operation. As illustrated in FIG. 13, the flowchart includes stages 311, 312, and 313 is which are inserted in the readout loop comprising the stages 162, 163, and 163 described with reference to FIG. 6. The stage 311 ascertains whether the air compressor 28 is in operation each time the processing goes through this readout loop once. If the air compressor 28 is in operation, control proceeds directly to the stage 163. If not, the processing goes to the stage 312 which queries as to the position of the U/D switch. If the U/D switch is in the height increasing position or "UP" position, then the processing proceeds to the stage 163. If not, then flow goes to the stage 313 which turns off the air compressor 28, and thereafter proceeds to the stage 163. While in leveling operation, most of the operation time of the CPU 52 is consumed by the processing in the readout loop. According to the previous embodiment, the above shifting of the U/D switch is not effective and the air compressor 28 cannot be turned off as long as the processing remains in the readout loop (for at most about 1 second). With the third modification, however, the air compressor 28 can quickly be inactivated when the U/D switch is shifted in the above manner. The third modification is advantageous where an air compressor is employed which can produce a large amount of pressurized air per unit time as compared with the volume of the air chambers of the pneumatic leveling units.

Figure 14:
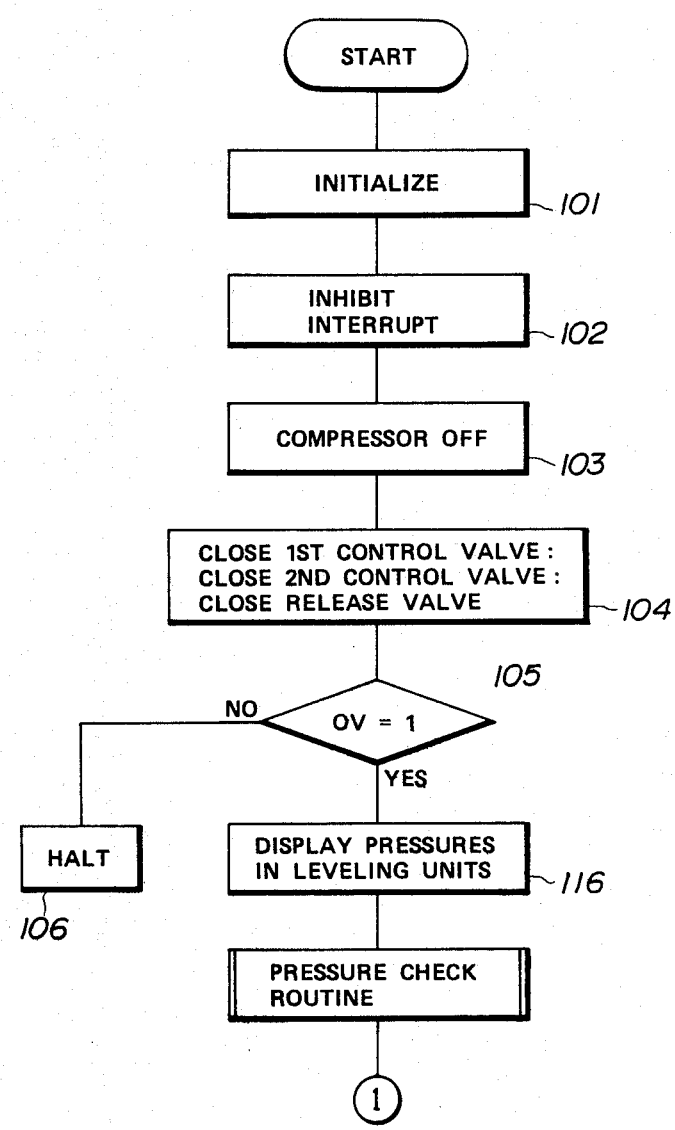
FIG. 14 is a flowchart piece of a modified portion of the program for a fourth modification of the vehicle leveling system of FIG. 1.

According to a fourth modification, a nonvolatile memory for storing the air pressure in the pneumatic leveling units is provided in the CPU, and the program is modified to shorten a preparation time when starting the vehicle leveling system by employing such a nonvolatile memory. FIG. 14 shows such a modified program from which the stages 107 through 115 described with reference to FIG. 3 are removed. The processing proceeds from the stage 105 directly to the stage 116 which displays leveling unit pressures based on pressure data stored in the nonvolatile memory. Since the processing goes to the stage 116 when the vehicle leveling system is started, the pressure data stored in the nonvolatile memory are data which have finally been stored when the vehicle leveling system was last used. The fourth modification is of advantage where the vehicle leveling system is expected to be used relatively frequently.

Figure 15:
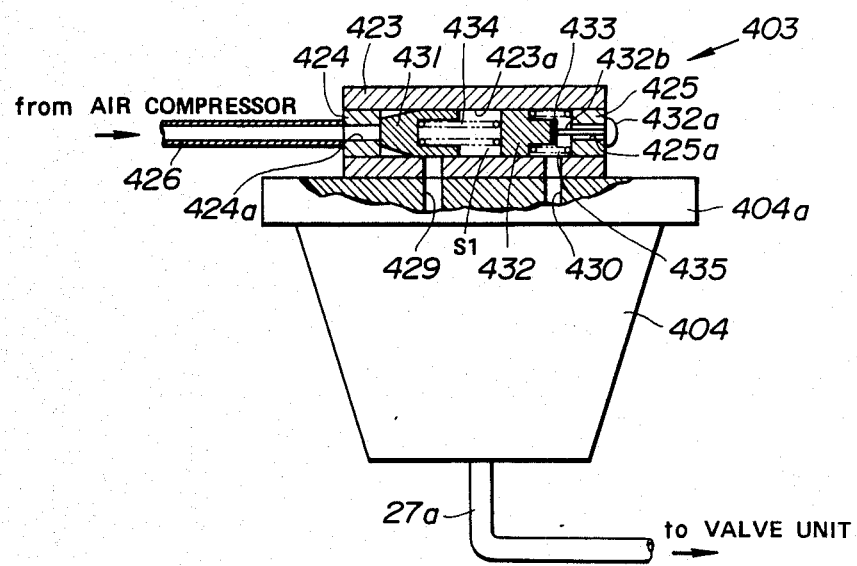
FIG. 15 is a view, partly in cross section, of a pressure release mechanism for an air drier according to a fifth modification of the vehicle leveling system of FIG. 1.

According to a fifth embodiment, a release mechanism for releasing a remaining air pressure is added to the air drier of the air pressure generator unit. FIG. 15 shows such a release mechanism in cross section. The release mechanism, generally denoted at 403, has a cylindrical body 423 having an axial through hole 423a of a circular cross section, the cylindrical body 423 serving as a casing of the release mechanism 403. The casing 423 is fixed to an air drier body 404. First and second plugs 424, 425 are fixedly disposed in the opposite end openings, respectively, of the axial through hole 423a. The first plug 424 has a hole 424a connected through an air pipe 426 to the outlet port of the air compressor 28. The second plug 425 has a hole 425a vented to the atmosphere. The casing 423 thus has a cylindrical space S1 defined in the hole 423a between the plugs 424, 425. The space S1 is held in fluid communication with the interior of the air drier body 404 through first and second passages 429, 430 defined through an upper plate 404a of the air drier body 404.

Within the space S1, there are disposed first and second valve members 431, 432 slidably held against the inner wall surface of the space S1. The first valve member 431 has a smaller-diameter end positioned to close the inner end opening of the hole 424a. The second valve member 432 also has a smaller-diameter end positioned opposite to the inner end opening of the hole 425a. A rod 432b is fixed to the smaller-diameter end of the second valve member 432 through a rubber member 433 thereon and projects through the hole 425a. The rod 432b has an enlarged head 432a of rubber closing the outer end opening of the hole 425a. A first spring 434 is interposed between the first and second valve members 431, 432, and a second spring 435 is interposed between the second valve member 432 and the inner end of the second plug 425. The first spring 434 and a spring 49a of the check valve 49 in the valve unit 26 (FIG. 1) have spring constants greater than the spring constant of the second spring 435. The first and second passages 429, 430 and the first and second valve members 431, 432 are relatively positioned and shaped such that when the air compressor 28 is not in operation, the first passage 429 is closed by the first valve member 431, and the second passage 430 is shut off from the atmosphere by the enlarged head 432a closing the hole 425a with the second valve member 432 positioned leftwardly of the second passage 430.

The air compressor 28 is operated to increase the motorcycle body height, and after the motorcycle has been leveled, the air compressor 28 is inactivated. At this time, the release mechanism 403 operates as follows:

When the air compressor 28 is operated, the air pressure acts via the air pipe 426 and the hole 424a on the first valve member 431. The second spring 435 of smaller spring constant is first compressed, so that the first and second valve members 431, 432 are moved to the right until the rubber member 433 on the smaller-diameter end of the second valve member 432 closes the hole 425a in intimate contact with the inner end of the second plug 425. Then, the pressurized air from the air compressor 28 continuously presses the first valve member 431 while compressing the first spring 434 until the first passage 427 is opened. The pressurized air is now allowed to pass through the air drier body 404 and the check valve 49 into the valve unit 26 and then into the front or rear pneumatic leveling units for increasing the motorcycle body height. After the motorcycle body height has been increased, a certain air pressure remains in the air drier 29, which pressure depends upon the air pressure supplied to the pneumatic leveling units for leveling the motorcycle. Therefore, the remaining air pressure is not constant. The first and second valve members 431, 432 will operate under the remaining air pressure and the resilient forces of the second spring 435 and the check valve spring 49a in the valve unit 26, as follows:

When the remaining air pressure in the air drier 29 is 2 kg/cm$^2$ or 4 kg/cm$^2$, for example, (as indicated by the curves A, B in FIG. 16), the sum of the resilient force of the second spring 435 and the remaining air pressure acting on the righthand end of the second valve member 32 through the second passage 430 is greater than the remaining air pressure acting on the righthand end of the first valve member 431 through the first passage 429. Therefore, immediately when the air compressor 28 is turned off, the second valve member 432 is moved to the left to allow the hole 425a to be opened temporarily and then to close the hole 425a with the enlarged head 432a. The initial remaining air pressure in the air drier 29 can thus be discharged into the atmosphere throught the second passage 430 and the hole 425a. Since the hole 425a is thereafter closed, the desiccant material such as silica gel in the air drier 29 is prevented from being affected by the moisture of the atmosphere. When the remaining air pressure in the air drier 29 is 8 kg/cm$^2$, for example, (as indicated by the curve C in FIG. 16), the pressure acting on the righthand end of the second valve member 432 is smaller than the pressure imposed on the lefthand end of the first valve member 431. The second valve member 432 is not moved to the left, and hence the initial air pressure is kept in the air drier 29 as indicated by the solid-line curve C. In this case, the air pressure in the valve unit 26 is detected by the pressure sensor 37, and after the air compressor 28 has been turned off, the release valve 36 is opened for a certain period of time to lower the initial remaining air pressure from the air drier 29 as indicated by the dotted-line curve C. As the remaining air pressure is lowered in the air drier 29, the second valve member 432 is permitted to move to the left for thereby opening the hole 425a temporarily into the atmosphere and then closing the same with the enlarged head 432a.

Figure 16:
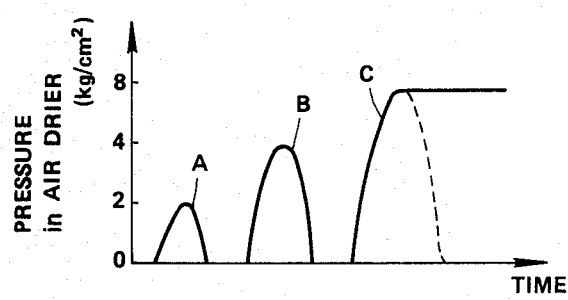
FIGS. 16 and 17 are graphs showing time-dependent variations of the pressure in the air driers, the graphs being explanatory of the function of the pressure release mechanism shown in FIG. 15.
Figure 17:
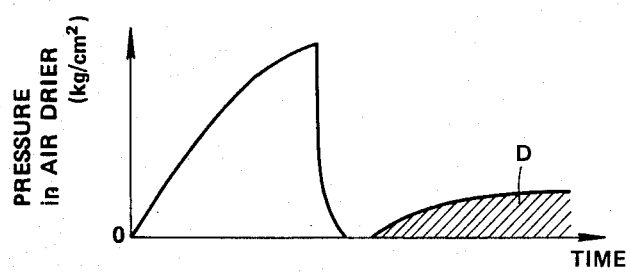

After the motorcycle body height has been increased, the remaining air pressure in the air drier 29 is reduced substantially to zero for each of the pressure curves A, B, C. In the air drier which is not equipped with the release mechanism 403, after the remaining air pressure has been eliminated, an air pressure is gradually increased with time in the air drier due to an air pressure remaining among the particles of the desiccant material in the air drier, to the point where the check valve 49 is pushed to introduce a secondary remaining air pressure into the central passage 44 in the valve unit 26 as indicated by D in FIG. 17. According to the fifth modification shown in FIG. 15, however, the remaining air pressure is discharged by the release mechanism 403 as shown in FIG. 16 to prevent the secondary remaining air pressure from being developed in the central passage 44 as illustrated in FIG. 17.

Since the remaining air pressure can be eliminated from the air drier 29 after the motorcycle body height has been increased, the air compressor 28 is prevented from being subject to a large load when it is operated again.

The valve unit 26 is employed for controlling the air flow in the previous embodiment and modifications thereof. Where the vehicle leveling system is to be mass-produced, it is highly preferable to assemble a plurality of valves in a single valve unit. However, the present invention can be embodied, preferably in some applications, by interconnecting separate valves through connector pipes. With such an alternative arrangement, it is believed that various requisite conditions to be met by the manner in which the control valves, the release valve, and the air pressure generator unit are interconnected, and the location where the air pressure in the pneumatic circuit is to be detected by the pressure sensor, can easily be determined on the basis of the aforesaid disclosure and the drawings.

The illustrated vehicle leveling system can easily be modified into a closed leveling system by employing a reservoir tank that is normally used in the known closed-type vehicle leveling system and by making required and obvious changes. In such a closed leveling system, the air drier may be dispensed with, and various gases other than air may be employed as the leveling medium.

It would be apparent for those skilled in the art to be able to design the vehicle leveling system of the present invention for use in other vehicles than motorcycles.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A vehicle leveling system comprising:
   a pneumatic leveling unit for adjusting the height of a vehicle body in response to supply and discharge of a gas pressure to and from the pneumatic leveling unit;
   gas pressure generator means for generating the gas pressure to be supplied to said pneumatic leveling unit;
   valve means pneumatically connected to said leveling unit and said gas pressure generator means and including a passage for supplying the gas pressure from said gas pressure generator means thereinto, a control valve for bringing said passage into and out of communication with said pneumatic leveling unit, and a release valve for bringing said passage into and out of communication with the atmosphere;
   control means for controlling said gas pressure generator means and said valve means to supply the gas pressure to and discharge it from said pneumatic leveling unit;
   said control means including switch means and a pressure sensor detecting gas pressure in said passage and generating a pressure output signal representing the detected gas pressure, gas pressure in said pneumatic leveling unit being detectable by said pressure sensor when said passage communicates with said pneumatic leveling unit;
   said control means being operable in respnse to commands applied by said switch means and the output signal from said pressure sensor; and
   said control means including means operable after the height of the vehicle body has been adjusted for effecting a pressure checking process by closing said control valve, then opening said release valve to vent said passage to the atmosphere, then closing said release valve, and then measuring the gas pressure in said passage with said pressure sensor and determining whether the measured pressure in said passage is substantially equal to the atmospheric pressure.

2. A vehicle leveling system according to claim 1, wherein said switch means includes a three-position switch having three selectable positions for manually increasing the height of the vehicle body, disabling manual adjustment of the height of the vehicle body, and manually reducing the height of the vehicle body, said control means being arranged such that it effects said pressure checking process upon elapse of a prescribed period of time after said three-position switch has been shifted from said position for disabling manual adjustment of the height of the vehicle body to one of the other positions and that it does not effect said pressure checking process before said elapse of said prescribed period of time.

3. A vehicle leveling system according to claim 1, wherein said control means is arranged such that after the height of the vehicle body has been adjusted, the control means produces a reference gas pressure for calibrating said pressure sensor by closing said control valve, then opening said release valve to vent said pressure in said passage with said pressure sensor.

4. A vehicle leveling system comprising:
   a pneumatic leveling unit for adjusting the height of a vehicle body in response to supply and discharge of a gas pressure to and from the pneumatic leveling unit;
   gas pressure generator means for generating the gas pressure to be supplied to said pneumatic leveling unit;
   valve means pneumatically connected to said leveling unit and said pressure generator means;
   control means for controlling said gas pressure generator means and said valve means to supply the gas pressure to and discharge it from said pneumatic leveling unit, said control means including a height sensor for detecting the height of the vehicle body and issuing a signal indicative of the detected height, and memory means for storing a reference height range and a proper pressure range for the gas pressure in said pneumatic leveling unit, said control means being arranged such that it can effect an automatic height adjustment in both the height increasing direction and the height reducing direction when the gas pressure in said leveling unit is within said proper pressure range, said automatic height adjustment being an adjustment for changing the height of the vehicle toward said reference height range in response to the output signal from said height sensor, said control means further being arranged such that it can effect said automatic height adjustment only in the height reducing direction when the gas pressure in said leveling unit is in excess of the upper limit of said proper pressure range, and only in the height increasing direction when the gas pressure in said leveling unit is lower than the lower limit of said proper pressure range.

5. A vehicle leveling system comprising:
a pneumatic leveling unit for adjusting the height of a vehicle body in response to supply and discharge of a gas pressure to and from the pneumatic leveling unit;
gas pressure generator means for generating the gas pressure to be supplied to said pneumatic leveling unit;
valve means pneumatically connected to said leveling unit and said gas pressure generator means;
control means for controlling said gas pressure generator means and said valve means to supply the gas pressure to and discharge it from said pneumatic leveling unit, said control means being arranged such that when the gas is to be discharged from said pneumatic leveling unit for reducing the height of the vehicle body, the control means controls said release valve to intermittently open and close the same according to the output signal of said pressure sensor for thereby reducing the pressure of the gas in said pneumatic leveling unit at a substantially constant speed.

6. A vehicle leveling system comprising:
a pneumatic leveling unit for adjusting the height of a vehicle body in response to supply and discharge of a gas pressure to and from the pneumatic leveling unit;
a power source coupled to energize the vehicle leveling system;
gas pressure generator means for generating the gas pressure to be supplied to said pneumatic leveling unit;
valve means pneumaticlaly connected to said leveling unit and said gas pressure generator means;
control means for controlling said gas pressure generator means and said valve means to supply the gas pressure to and discharge it from said pneumatic leveling unit, said control means including switch means, a pressure sensor for detecting the gas pressure in said pneumatic leveling unit and issuing an output signal representing the detected gas pressure, display means for displaying the gas pressure in said pneumatic leveling unit based on the output signal from said pressure sensor, and nonvolatile memory means for storing the output signal from said pressure sensor, said control means being arranged such that when the power source is turned on, it displays the gas pressure sensor which is stored in said nonvolatile memory means.

7. A vehicle leveling system comprising:
a pneumatic leveling unit for adjusting the height of a vehicle body in response to supply and discharge of a gas pressure to and from the pneumatic leveling unit;
gas pressure generator means for generating the gas pressure to be supplied to said pneumatic leveling unit;
valve means pneumatically connected to said leveling unit and said gas pressure generator means;
control means for controlling said gas pressure generator means and said valve means to supply the gas pressure to and discharge it from said pneumatic leveling unit;
said control means including a height sensor for detecting the height of the vehicle body and issuing a signal indicative of the detected height, memory means for storing a reference height range, switch means including manual leveling switch means for applying commands to start and terminate a manual height adjusting operation, and a pressure sensor for detecting the gas pressure in said pneumatic leveling unit and issuing an output signal representing the detected gas pressure; and
said control means being operable in response to commands applied by said switch means and the output signal from said pressure sensor and being arranged such that it can selectively effect an automatic height adjusting operation based on the output signal from said height sensor and said reference height range, and that it repeatedly stores the output signal of said pressure sensor for a first prescribed period of time in the manual height adjusting operation and for a second prescribed period of time in the automatic height adjusting operation, then computes the average of a series of output signals thus stored, and controls said gas pressure generator means and said valve means based on the computed average, said first prescribed period of time being shorter than said second prescribed period of time.

8. A vehicle leveling system comprising:
a pneumatic leveling unit for adjusting the height of a vehicle body in response to supply and discharge of a gas pressure to and from the pneumatic leveling unit;
gas pressure generator means for generating the gas pressure to be supplied to said pneumatic leveling unit;
valve means pneumatically connected to said leveling unit and said gas pressure generator means;
control mean for controlling said gas pressure generator means and said valve means to supply the gas pressure to and discharge it from said pneumatic leveling unit;
said control means including switch means including manual leveling switch means for applying commands to start and terminate a manual height adjusting operation, and a pressure sensor for detecting the gas pressure in said pneumatic leveling unit and issuing an output signal representing the detected gas pressure; and
said control means being operable in response to commands applied by said switch means and the output signal from said pressure sensor and being arranged such that it repeatedly stores the output signal of said pressure sensor for a prescribed period of time, then computes the average of a series of output signals thus stored, and controls said gas pressure generator means and said valve means based on the computed average, and that when a command from said manual leveling switch means for manually increasing the height of the vehicle body is terminated while the output signal of said pressure sensor is being repeatedly stored, the control means inactivates sid gas pressure generator means in preference to the repeated storage of the output signal of said pressure sensor.

9. A vehicle leveling system for use on a vehicle having a vehicle body and front and rear suspensions mounted on the vehicle body, comprising:

a front pneumatic leveling unit for cooperating with the front suspension for adjusting the height of a front portion of the vehicle body in response to supply of a gas pressure to and discharge thereof from the front pneumatic leveling unit;

a rear pneumatic leveling unit for cooperating with the rear suspension for adjusting the height of a rear portion of the vehicle body in response to supply of a gas pressure to and discharge thereof from the rear pneumatic leveling unit;

gas pressure generator means for generating the gas pressure to be supplied to said pneumatic leveling units;

a velve unit pneumatically connected to said pneumatic leveling units and said gas pressure generator means and including a body having a passage therein to which the gas pressure from said gas pressure generator means can be supplied, a first control valve for bringing said passage into and out of communication with said front pneumatic leveling unit, a second control valve for bringing said passage into and out of communication with said rear pneumatic leveling unit, and a release valve for bringing said passage into and out of communication with the atmosphere;

control means for controlling said gas pressure generator means, said first control valve, said second control valve, and said release valve for supplying the gas pressure to and discharging it from said front and rear pneumatic leveling units;

said control menas being arranged to selectively open said first and second control valves for selective operation of said front and rear pneumatic leveling units;

said control means including switch means and a pressure sensor mounted on said valve unit for detecting the gas pressure in said passage to thereby detect the gas pressure in one of said front and rear pneumatic leveling units which communicates with said passage;

said control means being operable in response to commands applied by said switch means and the output signal from said pressure sensor; and said control means being arranged such that after the height of the vehicle body has been adjusted, the control means can effect a pressure checking process by closing said control valve coacting with the pneumatic leveling unit by which the height of the vehicle body has been adjusted, then opening said release valve to vent said passage to the atmosphere, then closing said release valve, then measuring the gas pressure in said passage with said pressure sensor, and determining whether the measured pressure in said passage is substantially equal to the atmospheric pressure.

10. A vehicle leveling system for use on a vehicle having a vehicle body and front and rear suspensions mounted on the vehicle body, comprising:

a front pneumatic leveling unit for cooperating with the front suspension for adjusting the height of a front portion of the vehicle body in response to supply of a gas pressure to and discharge thereof from the front pneumatic leveling unit;

a rear pneumatic leveling unit for cooperating with the rear suspension for adjusting the height of a rear portion of the vehicle body in response to supply of a gas pressure to and discharge thereof from the rear pneumatic leveling unit;

gas pressure generator means for generating the gas pressure to be supplied to said pneumatic leveling units;

a valve unit pneumatically connected to said pneumatic leveling units and said gas pressure generator means and including a body having a passage therein to which the gas pressure from said gas pressure generator means can be supplied, a first control valve for bringing said passage into and out of communication with said front pneumatic leveling unit, a second control valve for bringing said passage into and out of communication with said rear pneumatic leveling unit, and a release valve for bringing said passage into and out of communication with the atmosphere;

control means for controlling said gas pressure generator means, said first control valve, said second control valve, and said release valve for supplying the gas pressure to and disharging it from said front and rear pneumatic leveling units;

said control means being arranged to selectively open said first and second control valves for selective operation of said front and rear pneumatic leveling units;

said control means including switch means and a pressure sensor mounted on said valve unit for detecting the gas pressure in said passage to thereby detect the gas pressure in one of said front and rear pneumatic leveling units which communicates with said passage;

said switch means including a three-position switch having three positions for applying commands for manually increasing the height of the vehicle body, disabling manual adjustment of the height of the vehicle body, and manually reducing the height of the vehicle body to said control means, and a two-position switch having two positions for applying commands for manually adjusting the height of the vehicle body with said front pneumatic leveling unit and for manually adjusting the height of the vehicle body with said rear pneumatic leveling unit;

said control means being operable in response to commands by said switch means and the output signal from said pressure sensor; and said control means being arranged such that it starts manually adjusting the height of the vehicle body in response to shifting of said three-position switch from said position for disabling manual adjustment of the height of the vehicle body to one of the other positions, and that it invalidates any change of the commands applied thereto by shifting said two-position switch while the height of the vehicle body is being adjusted.

* * * * *

UNITED STATES PATENT AND TRADEMARK OFFICE
CERTIFICATE OF CORRECTION

PATENT NO. : 4,709,934
DATED : December 1, 1987
INVENTOR(S) : Hideo Suzuki et al It is certified that error appears in the above-identified patent and that said Letters Patent are hereby corrected as shown below:

Column 2, line 42, delete "the" (first occurrence).

Column 3, line 49, "avaiable" should read --available--.

Column 6, line 18, "apparenty" should read --apparently--.

Column 7, line 1, "54 a position" should read --54 is in a position--.

Column 12, line 3, after "from" insert --the--.

Column 12, line 44, "-(minus)$68_2$" should read -- -(minus)$\varepsilon_2$--.

Column 12, line 55, after "counter" insert --is incremented--.

Column 14, line 8, after "for" delete --in--.

Column 15, line 37, after "described" delete --as--.

Column 15, line 55, "modifiation" should read --modification--.

Column 16, line 45, after "313" delete --is--.

Signed and Sealed this

Twenty-seventh Day of December, 1988

*Attest:*

DONALD J. QUIGG

*Attesting Officer*   *Commissioner of Patents and Trademarks*